United States Patent
Dhanwal et al.

(10) Patent No.: US 11,758,244 B2
(45) Date of Patent: Sep. 12, 2023

(54) METHODS AND SYSTEMS FOR STREAMING MEDIA CONTENT ON MULTIPLE DEVICES

(71) Applicant: Rovi Guides, Inc., San Jose, CA (US)

(72) Inventors: Ishan Dhanwal, Haryana (IN); Anjum Makkar, Punjab (IN); Vivek Sehgal, Uttar Pradesh (IN); Simranjeet Gill, Punjab (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/556,454

(22) Filed: Dec. 20, 2021

(65) Prior Publication Data
US 2023/0199275 A1     Jun. 22, 2023

(51) Int. Cl.
*H04N 21/8355*     (2011.01)
*H04N 21/442*     (2011.01)

(52) U.S. Cl.
CPC ... *H04N 21/8355* (2013.01); *H04N 21/44204* (2013.01)

(58) Field of Classification Search
CPC ............. H04N 21/8355; H04N 21/44204
See application file for complete search history.

(56) References Cited

U.S. PATENT DOCUMENTS

| | | | |
|---|---|---|---|
| 8,234,302 B1 | 7/2012 | Goodwin et al. | |
| 2010/0058400 A1* | 3/2010 | Nicas | H04N 7/17318 725/74 |
| 2015/0088646 A1 | 3/2015 | Mody | |
| 2015/0347769 A1 | 12/2015 | Espinosa et al. | |
| 2017/0127104 A1 | 5/2017 | Thomas et al. | |
| 2021/0243483 A1 | 8/2021 | Shi et al. | |
| 2021/0281915 A1* | 9/2021 | Ravindranath | H04N 21/2396 |

OTHER PUBLICATIONS

Haakon Riiser et al., "Video streaming using a location-based bandwidth-looking up service for bitrate planning," ACM Transactions on Multimedia Computing Communications and Applications, Association for Computing Machinery, vol. 8, No. 3, pp. 1-19 (2012).

* cited by examiner

*Primary Examiner* — Chenea Davis
(74) *Attorney, Agent, or Firm* — HALEY GUILIANO LLP

(57) ABSTRACT

Methods and systems are presented herein for streaming of media content. The methods and systems include receiving a request to stream a media content item; accessing a profile of a user authorized to access the streaming service; determining whether a bonus stream in addition to a default number of streams should be granted based on an analysis of at least one of: a status of the streaming service, a status of the requesting media device, metadata of the media content item, a status of the communication system, the profile, and a status of the currently streaming media device. Related apparatuses, devices, techniques, and articles are also described.

19 Claims, 15 Drawing Sheets

METHODS AND SYSTEMS FOR STREAMING MEDIA CONTENT ON MULTIPLE DEVICES

BACKGROUND

The present disclosure relates to streaming content and, more particularly, to methods and systems for streaming content from a content provider to a consumer device.

SUMMARY

Streaming services have grown to prominence in all areas of the media content delivery industry. Although the present disclosure provides examples from over-the-top (OTT) streaming delivery of video on demand (VOD), the present disclosure is applicable to all types of streaming services including streaming VOD, streaming television, streaming music on demand, internet radio, livestreaming, and the like. With the expansion of broadband internet bandwidth and access, content providers and consumers increasingly utilize streaming services for media content delivery and consumption on multiple devices associated with a single account or subscription.

In one approach, to handle streaming on multiple devices, a fixed number of devices (e.g., smart televisions, mobile devices, tablets, and the like) are authorized to stream from a content source via the same streaming account or subscription based on terms of the account or subscription. When the fixed number is reached, additional requests for access are denied or currently streaming users are randomly blocked. A consumer or owner of the account is required to purchase upgrades or sacrifice the stream of one of the fixed number of devices to comply with the terms and conditions of a streaming subscription. In these and other approaches, in order to use the streaming service, the consumer is required to list all possible devices in advance of a viewing session (i.e., preauthorization), set a home network (often with a limitation on the number of times such home network is set), periodically perform a mobile check-in (often including input of an access code provided via a separate device), and challenge-response tests like Completely Automated Public Turing test to tell Computers and Humans Apart (CAPTCHA).

The techniques of the present disclosure address these problems and provide an improved streaming experience. Methods, systems, computer-readable media, apparatuses, techniques, devices, and articles are provided for improving control of streaming delivery of media content and for overcoming the requirements and frustrations associated with streaming limits. Instead of requiring an end to a streaming session, payment of a premium, or the like, in some exemplary embodiments, an additional stream above the predetermined maximum number of streams is provided in response to specific conditions, states, and predictions, which are detailed herein. Instead of requiring pre-authorization of devices, home network setting, mobile check-ins, challenge-response, and the like, in some exemplary embodiments, dynamic account management is performed automatically (e.g., without user input). In certain embodiments, selectable options are presented to the consumer to manage the account. In some exemplary embodiments, a stream is made available by downloading content to a local device or remote storage device, thereby reducing a risk of overload on content delivery and communication systems. Creators, content owners, and media distributors are protected while providing consumers with greater convenience and without compromising quality or instantaneous access.

A system is provided for controlling delivery of media content from a streaming service to a media device through a communication system. In some exemplary embodiments, the system is configured to perform one or more methods related to control of content delivery. In one exemplary implementation, a request is received to stream a media content item. The system is configured, in response to the request, to access a profile of a user authorized to access the streaming service, identify a maximum number of streams authorized by the streaming service, and determine a number of devices currently streaming content and whether the maximum number would be exceeded by granting the request. If the maximum number of streams would be exceeded, instead of denying the request or requiring onerous requirements, in some implementations, the system is configured to perform an analysis to determine whether an additional stream (or bonus stream) should be granted.

The bonus stream analysis includes, in some implementations, determination of a status of various components, analysis of metadata, and the like. For example, the analysis includes determining that the status of the streaming service is sufficient to deliver a high-quality stream to the media device of the bonus user. The analysis by the system may determine that the requesting media device is connected via a broadband internet connection capable of receiving the high-quality stream. The status of one or more communication systems between the streaming service and the user's media device may be analyzed and determined to be favorable to the bonus stream. The profile of the authorized user may be determined by the system to be in good standing with 12 on-time consecutive payments. In some implementations, satisfaction of one or more of these conditions may result in the temporary authorization of the requested stream.

In some implementations, content may be delivered by the system to a local storage device to free up a stream. In these implementations utilizing local storage, the maximum number of streams is maintained at the maximum number. In these implementations, the system determines that a storage device has sufficient authorized storage to store a remaining portion of the media content item playing on at least one of the currently streaming media devices. After this determination, the system sends the remaining portion of the content item to the storage device, and disconnects the currently streaming media device from the streaming service. Thus, a stream is freed up, and the number of currently streaming media devices is caused to be less than or equal to the maximum number. Stored data may be redistributed on a local device or network to emulate a stream from the server.

In some implementations, a time remaining and/or usage pattern of the connected devices is analyzed, and the device determined to have the shortest time remaining is targeted for the selective download. That is, the system is configured to determine, for each of the currently streaming media devices, a length of time remaining for the media content item; identify the currently streaming media device of the currently streaming media devices having a shortest length of time remaining for the media content item and/or a highest likelihood of streaming additional media content items; determine that a storage device has sufficient storage to store a remaining portion of the media content item playing on the currently streaming media device having the shortest length of time remaining; send the remaining portion to the storage device; and disconnect the currently streaming media device having the shortest length of time remaining to free up a stream and cause the number of currently streaming media devices to be less than or equal to the maximum number.

The bonus stream analysis includes, in some implementations, analyzing consumption patterns of one or more media devices and associated with one or more user profiles, and the analyzed consumption patterns are used to support reward of a bonus screen or triggering of the downloading process. The system may also be configured to identify one or more exception conditions that result in the granting of the bonus screen or the triggering of the downloading process. For instance, in some implementations, the exception condition is satisfied in response to one or more conditions including a number of consecutive on-time payments for a subscription to the streaming service meets or exceeds a maximum number, the subscription is in good standing, the subscription is a premium plan, and no violation of terms of service of the subscription has occurred.

In some implementations, the bonus screen is provided, or the downloading process is performed without a need for extra steps that may be inconvenient for a user. For example, the system does not necessarily require one or more of obtaining prior authorization of the requesting media device, setting a home network, performing a mobile check-in, completing a challenge-response, and inputting of an access code.

The bonus stream analysis includes, in some implementations, predicting, with a predictive model, an impact of the addition of the requested stream on the status of various components of the system. These various components include the streaming service, the requesting media device, the media content item, the communication system, the user profile, and the currently streaming media device. The impact may be quantified in terms of whether a predetermined standard is satisfied. For instance, in some implementations, the predetermined standard of the streaming service is a load on the service.

The system performs load-balancing in some exemplary embodiments to ensure that one or more components of the system are in an optimal condition for delivering an additional stream or downloading content. For example, in some implementations, a load-increasing function of the stream is disabled to reduce a load on one or more of the streaming service, the requesting media device, the communication system, and the currently streaming media device. Examples of load-increasing functions are those identified by load-balancing techniques, e.g., least connection, least bandwidth, round robin, server response time, weighted versions of the same, resource-based techniques, and address hashing. After the disabling of the load-increasing function, the load may be analyzed again to determine if the predetermined standard is satisfied. In some implementations, a trick-mode function (see full description below) is disabled during provision of the bonus stream and/or downloading function.

In some implementations, the predictive model is based on one or more of a hard rule; a user-defined rule; a rule defined by the streaming service; a hard model; a learning model; a usage pattern of one or more of the streaming service, the requesting media device, the media content item, the communication system, the profile, and the currently streaming media device; load data of one or more of the streaming service, the requesting media device, the media content item, the communication system, the profile, and the currently streaming media device; and metadata of one or more of the streaming service, the requesting media device, the media content item, the communication system, the profile, and the currently streaming media device.

The system is configured, in some implementations, to identify priority and non-priority devices and/or users. In some implementations, the analyzing of the status includes determining that the requesting media device has either a priority status or a non-priority status and/or determining that the currently streaming media device has either a priority status or a non-priority status. The priority device and the non-priority device may have unique graphical user interfaces and associated functionality. The determining of one of the priority or non-priority status may result in activation or deactivation of features on one device or the other.

Various user control interfaces may be provided. In one exemplary embodiment, the user control interface includes one or more selectable options to control a function of the stream of any currently streaming media device, the functions including ending the stream, setting a length of time of the stream, extending a length of time of the stream, setting a start time of the stream, setting an end time of the stream, accepting a request to extend a length of time of the stream, and denying a request to extend a length of time of the stream.

The priority or non-priority status is determined in some implementations based on one or more of a query of a priority list of media devices stored in the profile, an average length of time for a continuous session of the media content item playing on each media device, a location of the media device, and a local time of the media device.

The user control interface includes in some implementations a selectable option to end a streaming session of any currently streaming media device to free up a stream and cause the number of currently streaming media devices to be less than or equal to the maximum number.

The authorized requested stream may be authorized for a predetermined time limit, e.g., one hour, one day, one week, one month, and the like.

One or more methods for performing one or more of the functions noted herein are provided.

One or more non-transitory computer-readable media having non-transitory, computer-readable instructions encoded thereon for controlling delivery of media content from a streaming service to a media device through a communication system are provided. The instructions include one or more implementations including one or more of the functions noted herein.

One or more devices for performing one or more of the functions noted herein are provided.

The techniques and approaches disclosed herein address and overcome the problems of prior approaches. For example, in some exemplary embodiments, denial of additional requests for access are prevented by granting a bonus stream, and/or downloading content locally to free up a stream. The automated nature of the bonus stream and local download embodiments eliminate the need in prior approaches for preauthorization, setting of the home network, mobile check-in, and the often-frustrating CAPTCHA.

Notably, the present disclosure is not limited to the combination of the elements as listed herein and is assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various exemplary embodiments, is described in detail with reference to the following figures. The drawings are provided for purposes of illustration only and merely depict exemplary embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The exemplary embodiments herein are better understood by referring to the following description in conjunction with the accompanying drawings, in which like reference numerals indicate identically or functionally similar elements, and in which.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments.

DETAILED DESCRIPTION

The present methods and systems provide content providers and content subscribers improved control of servers, media devices, and related devices. In some exemplary embodiments, the system enhances a viewing experience provided on all media devices connected to a streaming service. The improved control includes an ability to control and/or prioritize one, more or all devices linked to a streaming account or subscription. The devices include smart displays, mobile devices, tablets, laptops, desktops, and the like. On the content provider side, strict limits on usage are relaxed as a reward for patterns of affirmative behavior on the part of the user, in response to beneficial consumer behavior (e.g., on-time payment), favorable network conditions, and the like, detailed herein.

In some exemplary embodiments, the system is configured with device management tools, which permit the owner, authorized user, or primary user to generate a list of devices, and/or a list of users. In some exemplary embodiments, the system is configured with prioritization tools, which prompt the owner, authorized user, or primary user to prioritize the list of devices, and/or the list of users. In some exemplary embodiments, the system is configured to strike a balance between user control and consumption functions of importance to content consumer devices and reinforcement of policies of importance to a content provider and related system or network load considerations.

The streaming service is configured by the content provider, via the account or subscription, to permit up to a maximum number of simultaneous streams in a default state. One or more media devices up to and including the maximum number of devices are authorized to actively stream content. In some exemplary embodiments, an additional stream is provided, under conditions specified herein, when the maximum number of devices are utilizing the streaming service, and when an additional media device requests access to the account or subscription. Also, in a state where one or more users are aware of a future request for an additional stream, the present methods, systems, and devices provide additional controls to manage such situations. Further, one or more types of predictions are made of a likelihood that a future state is expected, e.g., a likelihood that an additional stream beyond the maximum number of devices will be needed in the future; the present methods, systems, and devices provide for inputs to achieve the predictions, processing to achieve the predictions, and outputs related to the predictions.

Figure 1A:
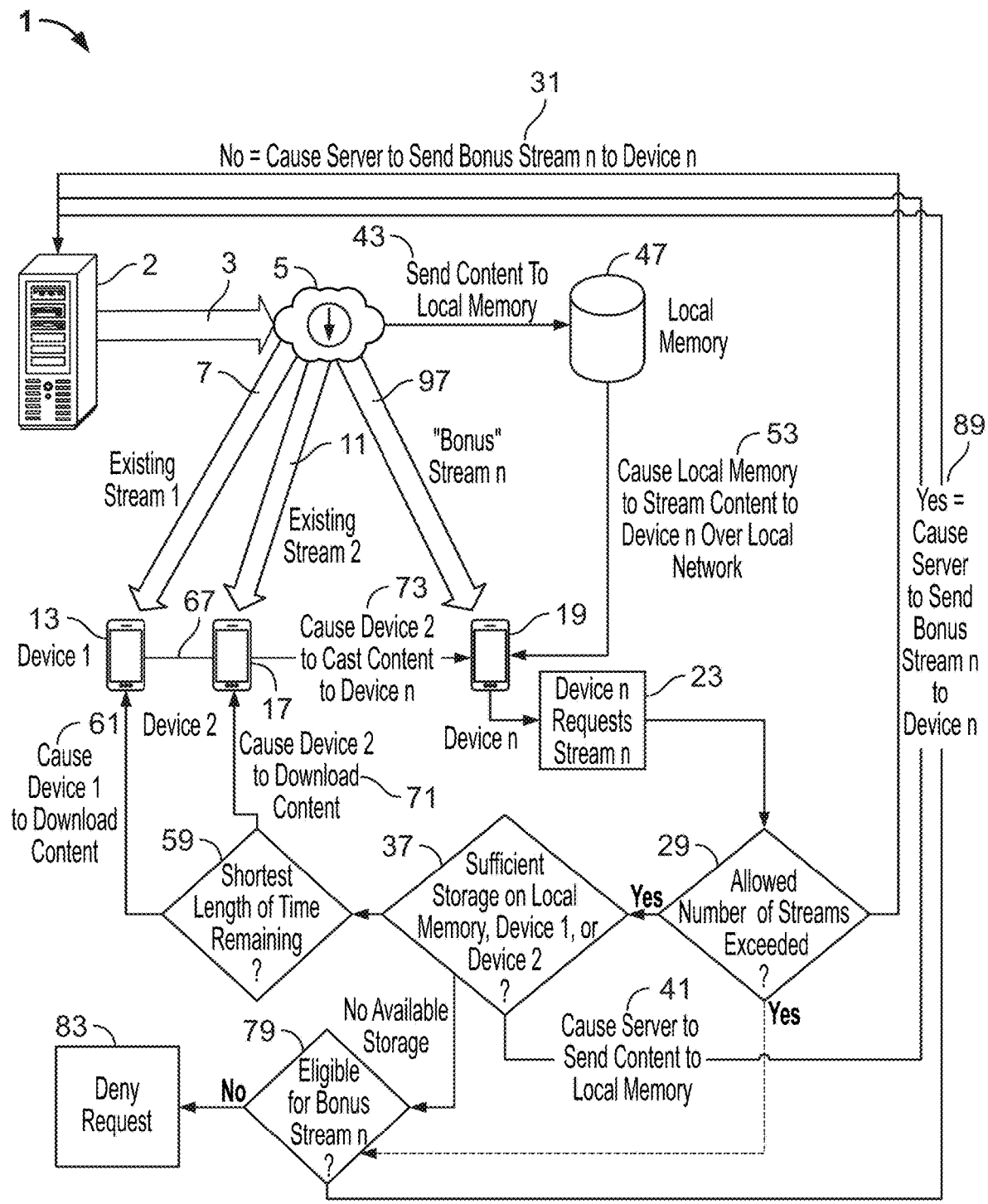
FIG. 1A depicts a use case, according to an exemplary embodiment.

In an exemplary use case, as shown in FIG. 1A, Mercury is a streaming service configured with a system 1 in accordance with the present disclosure. As shown in FIG. 1A, a server 2 is provided according to an exemplary embodiment. The server 2 controls a cloud-based streaming service 5. The server 2 is configured to transmit content to the streaming service 5 via a communication system 3. The server 2 is directly or indirectly connected to one or more of the streaming service 5, a first media device 13, a second media device 17, and an n-th media device 19 (although three media devices are provided in this exemplary embodiment, by use of n and n-th, it is understood two, three, four or more media devices are provided in various embodiments). The streaming service 5 is configured to transmit a first stream of content 7 to the media device 13, a second stream of content 11 to the media device 17, and an n-th or bonus stream of content 97 to the media device 19.

Mom signed up for Mercury using her email and credit card. Mom is the account owner. Mom's Mercury subscription is limited to a maximum of four streams. Mom is watching "Hypnotic" on a smartphone (e.g., media device 13), Dad is watching "Squid Game" on a tablet (e.g., media device 17), Junior is watching "Army of Thieves" on a smartphone (not shown), and Grandma is watching "Maid" on a legacy television connected to a streaming media box system (not shown). All four of Mom, Dad, Junior, and Grandma are currently viewing Mercury streams associated with Mom's account. A potential fifth streamer, Grandpa, is about to come home from the grocery store and wants to watch "King Arthur: Legend of the Sword" on a network-connected computer (e.g., media device 19). It is noted that, at the time of the present application, the exemplary content items noted herein are available on Netflix; however, solely for the purposes of explaining the present features, assume that all five content items are available on Mercury. The shared facts and examples below are not intended to be limiting, merely illustrative. The features of the examples herein may be freely combined with the features of any other example or exemplary embodiment in any suitable combination.

In response to Grandpa using his network-connected computer (e.g., media device 19) to request a fifth stream 23 to play King Arthur: Legend of the Sword, the system 1 is configured to make one or more of several determinations in any suitable order, including: determining whether a number of streams allowed on Mom's subscription exceeds four (29); determining, at 37, whether any of the currently connected devices (e.g., media devices 13, 17 and/or local memory 47) has sufficient storage to download a remaining portion of content streaming on one of the currently connected devices; and/or determining, at 79, whether Mom is eligible for a bonus stream. In some exemplary embodiments, if the number of allowed streams is exceeded (Yes at 29), the system 1 is configured to make the sufficient storage determination 37. In some exemplary embodiments, if the number of allowed streams is not exceeded (No at 29), the system 1 is configured to cause, at 31, the server 2 to send the bonus stream 97 to the media device 19. In some exemplary embodiments, if the number of allowed streams is exceeded (Yes at 29), the system 1 is configured to make the bonus eligibility determination at 79 without the sufficient storage determination at 37. In some exemplary embodiments, in response to the sufficient storage determination at 37, and when the local memory 47 is determined to have sufficient storage, the system 1 is configured to cause the server 2 to send content to the local memory 47, which may be sent, at 41, via the streaming service 5. The system 1 is configured in some exemplary embodiments to cause the local memory 47 to stream, at 53, the content to the media device 19 over a local network. Delivery, at 53, via the local network bypasses the need for the bonus stream 97.

NOTE: As used herein, the term "download" is not intended to be limiting and may include buffering and/or pre-fetching operations. In some exemplary embodiments, a download is performed in anticipation of switching a device from streaming to local playback (i.e., no more content will be fetched from a server). In some exemplary embodiments, a pre-fetching operation is performed to assist in a seamless transition. For example, if a decision to download occurs while a user is 30 minutes into a movie, the service is configured to start downloading from minute 33 onward (e.g., to persistent storage), while streaming continues up to minute 33. In this example, content is requested by the player, and buffered for normal playback operations and/or rendering.

In some exemplary embodiments, in response to determining that the media device 13 has sufficient storage, and/or that the media device 17 has sufficient storage, the system 1 is configured to make a determination, at 59, of a shortest length of time remaining on a currently streaming session of the media devices 13 and/or 17. In response to determining that the media device 13 has a shorter length of time remaining via the existing stream 7 as compared to that of the media device 17 via the existing stream 11, the system 1 is configured to cause, at 61, the media device 13 to download the remaining content. The downloading 61 of the remaining content may be pulled from the streaming service 5 via the existing stream 7; and/or from a storage device (not shown) of the media device 13 (e.g., storage device 113 of the media device 109 of FIG. 1C); and/or from the local memory 47; and/or from any other suitable storage device. In some exemplary embodiments, the system 1 is configured to cause the media device 13 (and/or 17) to cast content to the media device 19 (67). Casting 73 includes but is not limited to screen casting, mirroring, screen sharing, casting from phone to TV, casting from one media device to another, and the like. Delivery via casting 73 bypasses the need for the bonus stream 97.

Similarly, in response to determining that the media device 17 has a shorter length of time remaining in the existing stream 11 as compared to that of the media device 13 via the existing stream 7, the system 1 is configured to cause the media device 17 to download 71 the remaining content. The downloading 71 of the remaining content may be pulled from the streaming service 5 via the existing stream 11; and/or from a storage device (not shown) of the media device 17 (e.g., storage device 131 of the media device 127 of FIG. 1C); and/or from the local memory 47; and/or any other suitable storage device. In some exemplary embodiments, the system 1 is configured to cause the media device 17 to cast content 73 to the media device 19. Delivery via casting 73 bypasses the need for the bonus stream 97. In other words, the system 1 is configured to deliver content to the media device 19 using one or more of the local network 53, the casting 67, the casting 73, and the bonus stream 97.

In response to the determination, at 37, that none of the currently connected devices (e.g., media devices 13, 17 and/or local memory 47) has sufficient storage to download the remaining portion of the content streaming on one of the currently connected devices (at 37), and in response to the determination that Mom is not eligible for the bonus stream (at 79), Grandpa's request 23 to play King Arthur: Legend of the Sword is denied 83. However, in response to the determination 37 that none of the currently connected devices (e.g., media devices 13, 17 and/or local memory 47) has sufficient storage to download the remaining portion of the content streaming on one of the currently connected devices, and/or in response to the determination, at 79, that Mom is eligible for the bonus stream, the system 1 is configured to cause 89 the server 2 to send content to the media device 19 via the streaming service 5 and the bonus stream 97.

Some or all the steps shown in FIG. 1A may be omitted or duplicated. For instance, in some exemplary embodiments, immediately after Grandpa's request 23 to play King Arthur: Legend of the Sword, the system 1 is configured to make the sufficient storage determination 37; in other exemplary embodiments, immediately after Grandpa's request 23 to play King Arthur: Legend of the Sword, the system 1 is configured to make the bonus eligibility determination 79. In still other exemplary embodiments, any, or all the determinations 29, 37, 59, 79 may be made with or without the determination 23. Illustration of all possible exemplary embodiments are omitted for brevity. See, also, the additional examples herein.

Figure 1B:
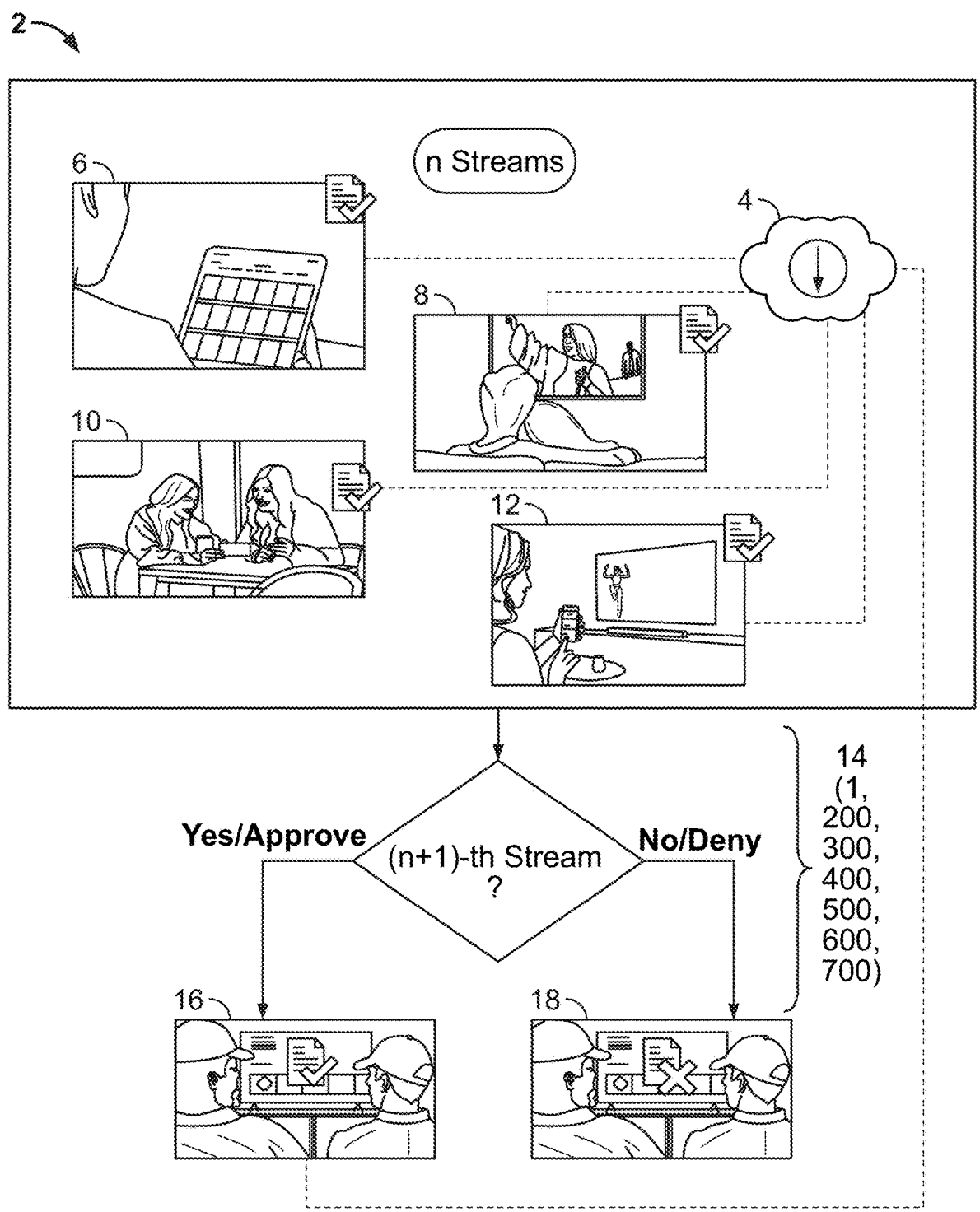
FIG. 1B depicts an overview of a system and method according to an exemplary embodiment.

As shown in the overview of FIG. 1B, according to an exemplary embodiment, a streaming service 2 is configured, according to a contract, to deliver up to a maximum of four streams of content to four media devices 6, 8, 10, 12, via a cloud-based server 4. The media devices 6, 8, 10, 12 include, e.g., a first user viewing a menu of content items on a tablet 6, a second user and a third user viewing a content item on a smart television 8, a fourth user and a fifth user viewing a content item on a smartphone 10, and a sixth user viewing a content item on another smart television 12. The streaming service 2 is further configured to perform an analysis 14 (examples of the analysis 14 include one or more of methods and processes 1, 200, 300, 400, 500, 600, 700, and the like disclosed herein (FIGS. 1A, 2, 3, 4, 5, 6, and 7)) to determine whether an optional fifth stream (e.g., viewable by a seventh user and an eighth user interested in viewing a content item on yet another smart television) will be authorized 16 or denied 18.

Figure 1C:
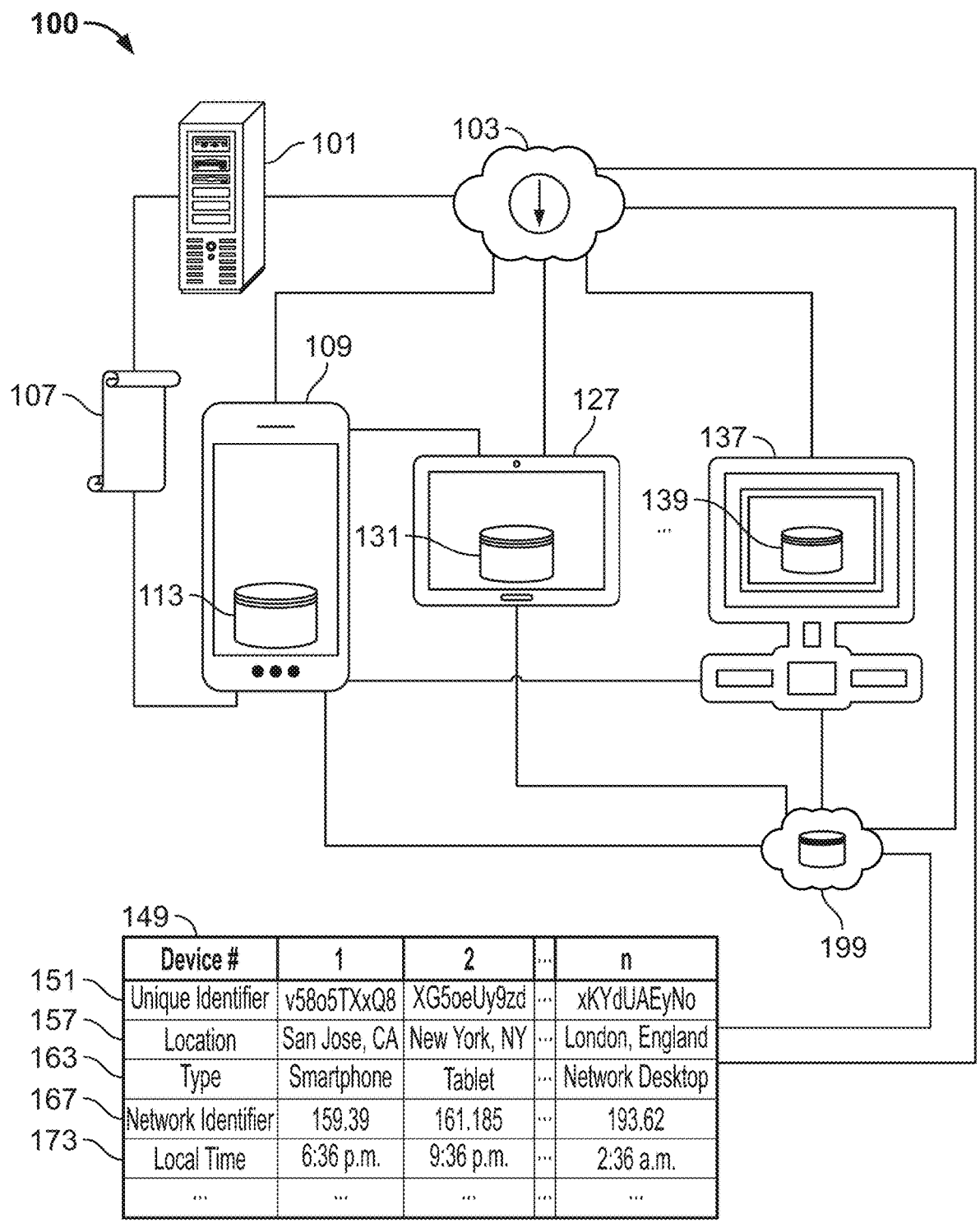
FIG. 1C depicts a system for controlling delivery of media content, according to an exemplary embodiment.
Figure 2:
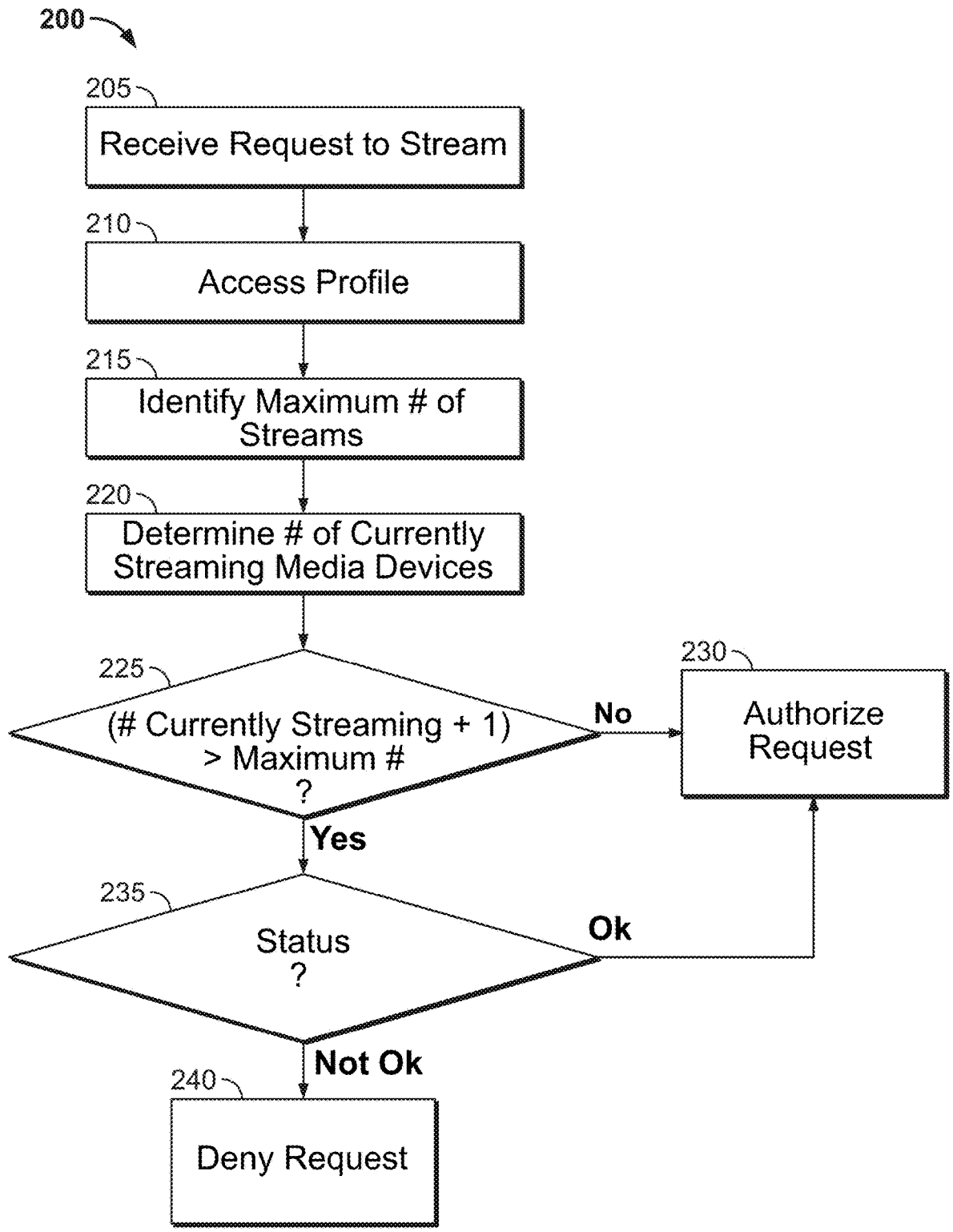
FIG. 2 depicts a method for controlling delivery of media content, according to an exemplary embodiment.
Figure 8:
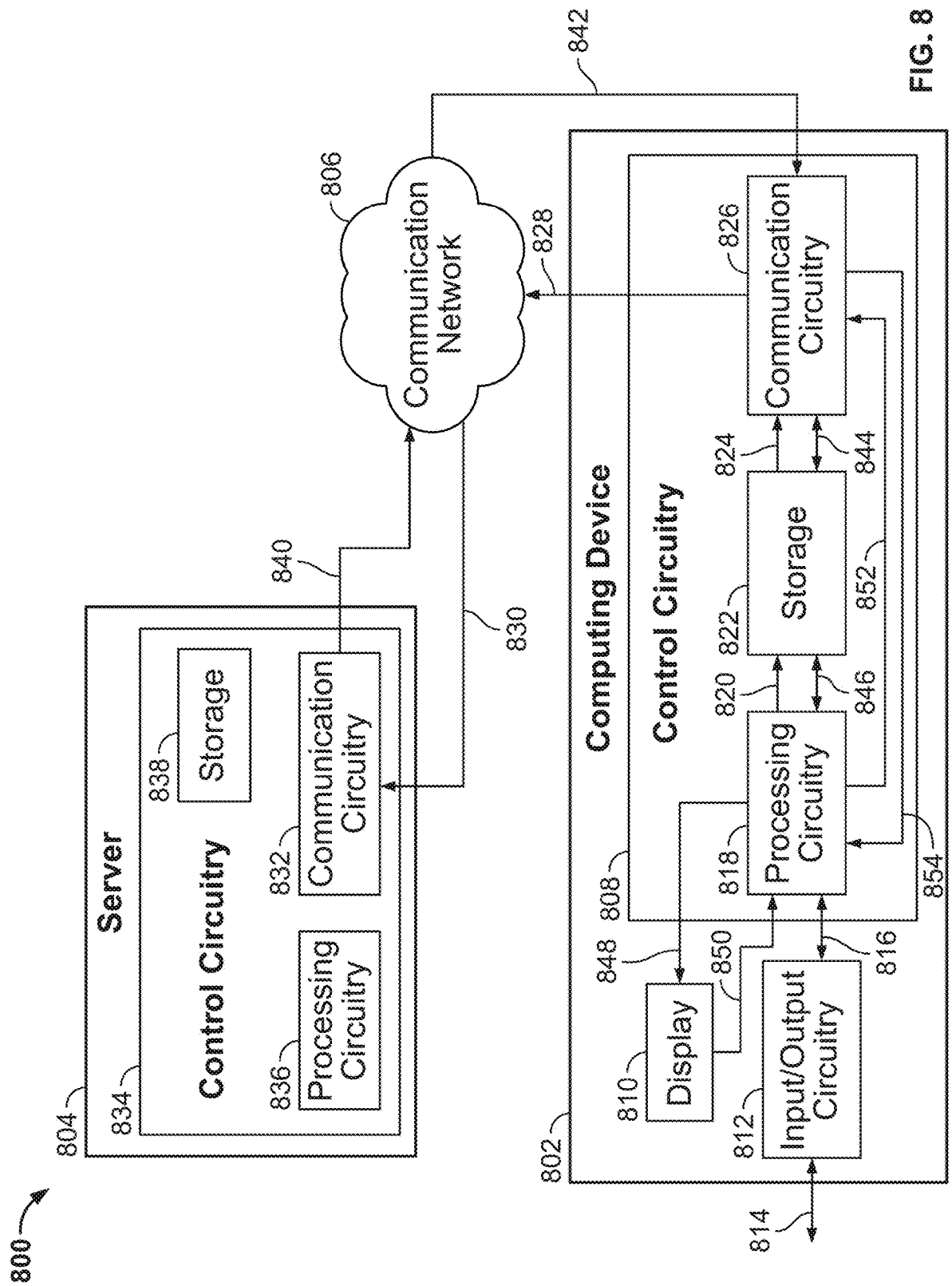
FIG. 8 depicts a system for controlling delivery of media content, according to an exemplary embodiment.
Figure 9:
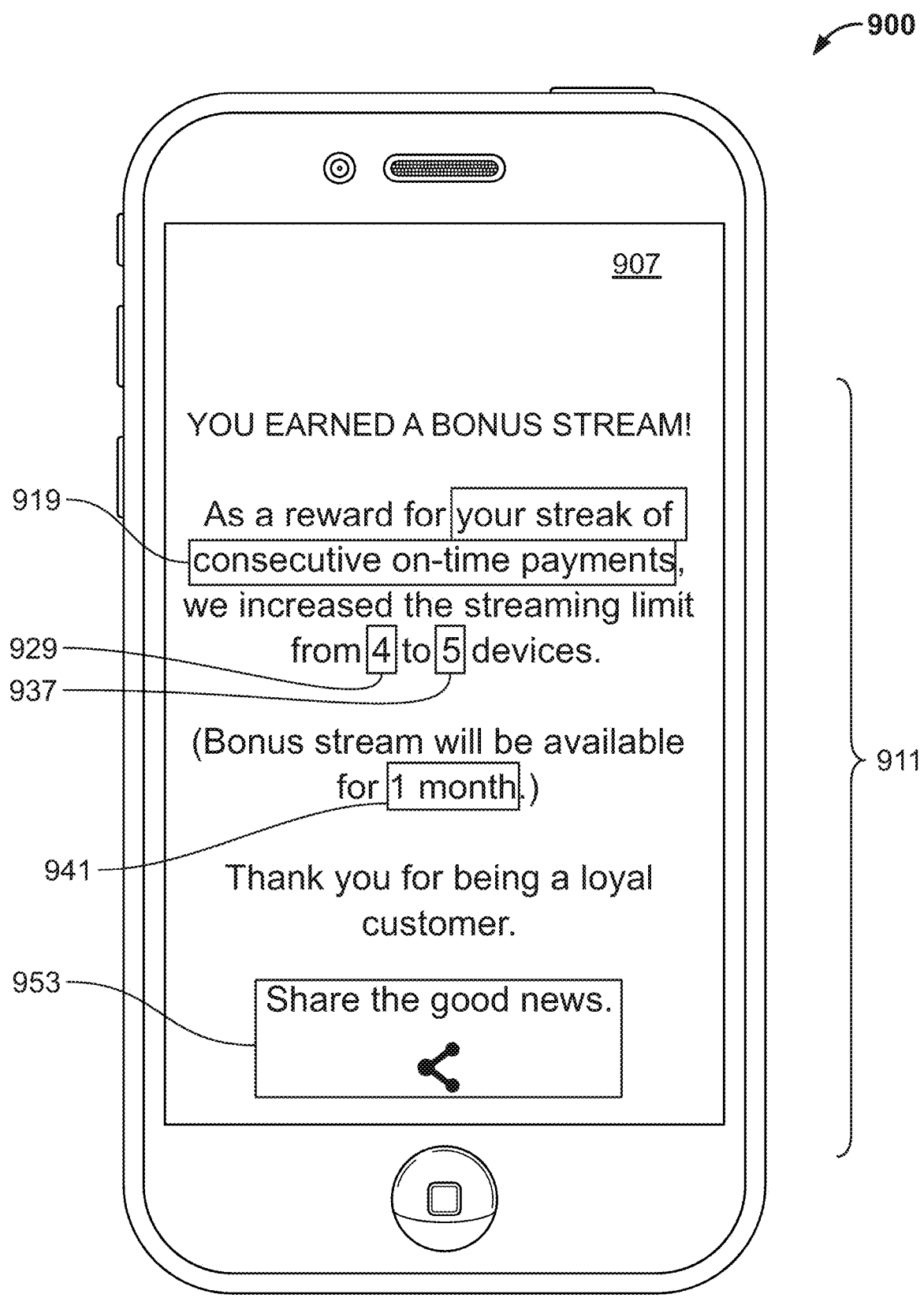
FIG. 9 depicts a bonus screen displayed on a smartphone, according to an exemplary embodiment.
Figure 10:
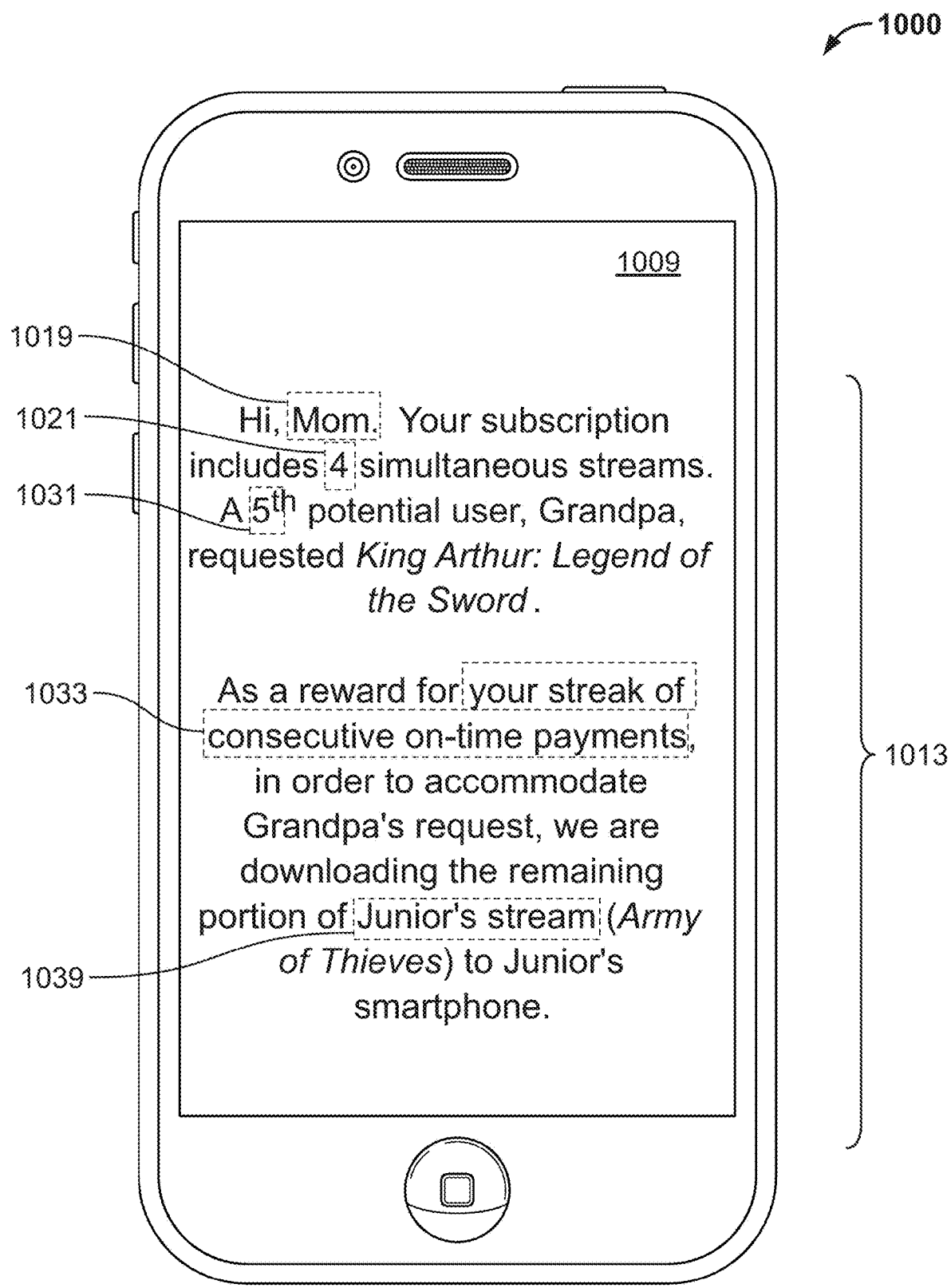
FIG. 10 depicts a download notification displayed on a smartphone, according to an exemplary embodiment.

FIG. 1C is a schematic diagram of a system 100 for controlling delivery of media content, according to an exemplary embodiment. FIG. 2 is a flowchart of a method 200 for controlling delivery of media content, according to an exemplary embodiment. The method 200 includes transmitting media content from a streaming service 103 to a media device 109, 127, 137 through a communication system or network 806 (FIG. 8). The method 200 may include one or more of methods 300, 400, 500, 600, 700, and the like.

As shown in FIG. 1C, a server 101 is provided according to an exemplary embodiment. The server 101 controls a cloud-based streaming service 103. The server 101 is connected to one or more of a first media device 109, a second media device 127, an n-th media device 137, and a cloud-based service including the streaming service 103 and an external cloud-based service 199. Each of the devices 109, 127, 137 includes a storage device 113, 131, 139, respectively. Each of the devices 109, 127, 137 is connected to the cloud-based service including the streaming service 103 and, in some implementations, the external cloud-based service 199. Data about each of the devices 109, 127, 137 are stored in a media device manifest 149, which is stored in the server 101, the cloud-based service of the streaming service 103, the external cloud-based service 199, or any other type of storage. In some implementations, the media device manifest 149 is stored in a secure manner. In some implementations, the media device manifest 149 is encrypted. For each of the devices 109, 127, 137, in some implementations, the media device manifest 149 contains one or more of a unique identifier 151, location 157, type 163, network identifier 167, local time 173, local date, an assignable priority status of the device (not shown), and other forms of information (not shown) including metadata of a currently streaming content item, and metadata associated with one or more previously streaming content items (see also FIG. 6).

Figure 6:
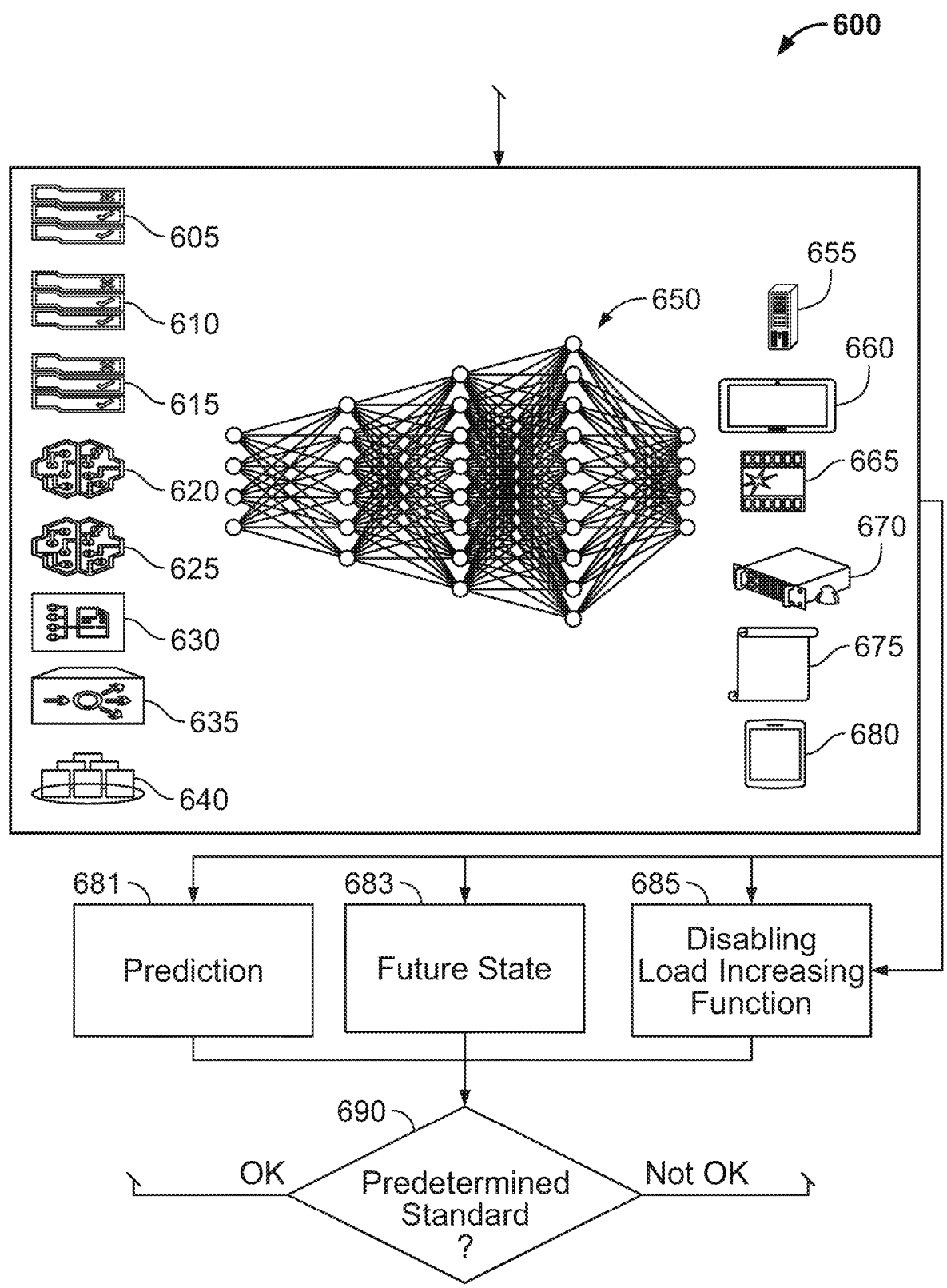
FIG. 6 depicts a method for predicting a future state of a component of the system, according to an exemplary embodiment.

As shown in FIG. 2, in one exemplary embodiment, the method 200 includes receiving, at 205, a request to stream a media content item 665 (FIG. 6). In response to receiving the request, one or more actions are performed. The method 200 includes accessing, at 210, a profile or contract 107 of a user authorized to access the streaming service 103. The method 200 includes identifying, at 215, a maximum number of streams authorized by the streaming service 103 to stream the maximum number of media content items to the maximum number of media devices. The method 200 includes determining, at 220, a number of currently streaming media devices. The method 200 includes determining, at 225, whether addition of the requested stream would, if authorized, cause the number of currently streaming media devices to exceed the maximum number (225). The method 200 includes, in response to determining that the addition of the requested stream would not, if authorized, cause the number of currently streaming media devices to exceed the maximum number (No at 225), authorizing the requested stream, at 230. The method 200 includes, in response to determining that the addition of the requested stream would, if authorized, cause the number of currently streaming media devices to exceed the maximum number (Yes at 225), analyzing, at 235, a status of one or more components of the streaming service 103. The method 200 includes, based on the analyzed status (235), authorizing the requested stream (230). The method 200 includes, based on the analyzed status (235), denying the requested stream (240).

The method 200 includes, in response to determining that the addition of the requested stream would, if authorized, cause the number of currently streaming media devices to exceed the maximum number, analyzing the status (235) of one or more components of the system of the requesting media device 137. The method 200 includes, in response to determining that the addition of the requested stream would, if authorized, cause the number of currently streaming media devices to exceed the maximum number, analyzing the status (235) of the media content item 665 FIG. 6), the communication system or network 806 (FIG. 8), the profile or contract 107 or of the currently streaming media device 109, 127.

Figure 7:
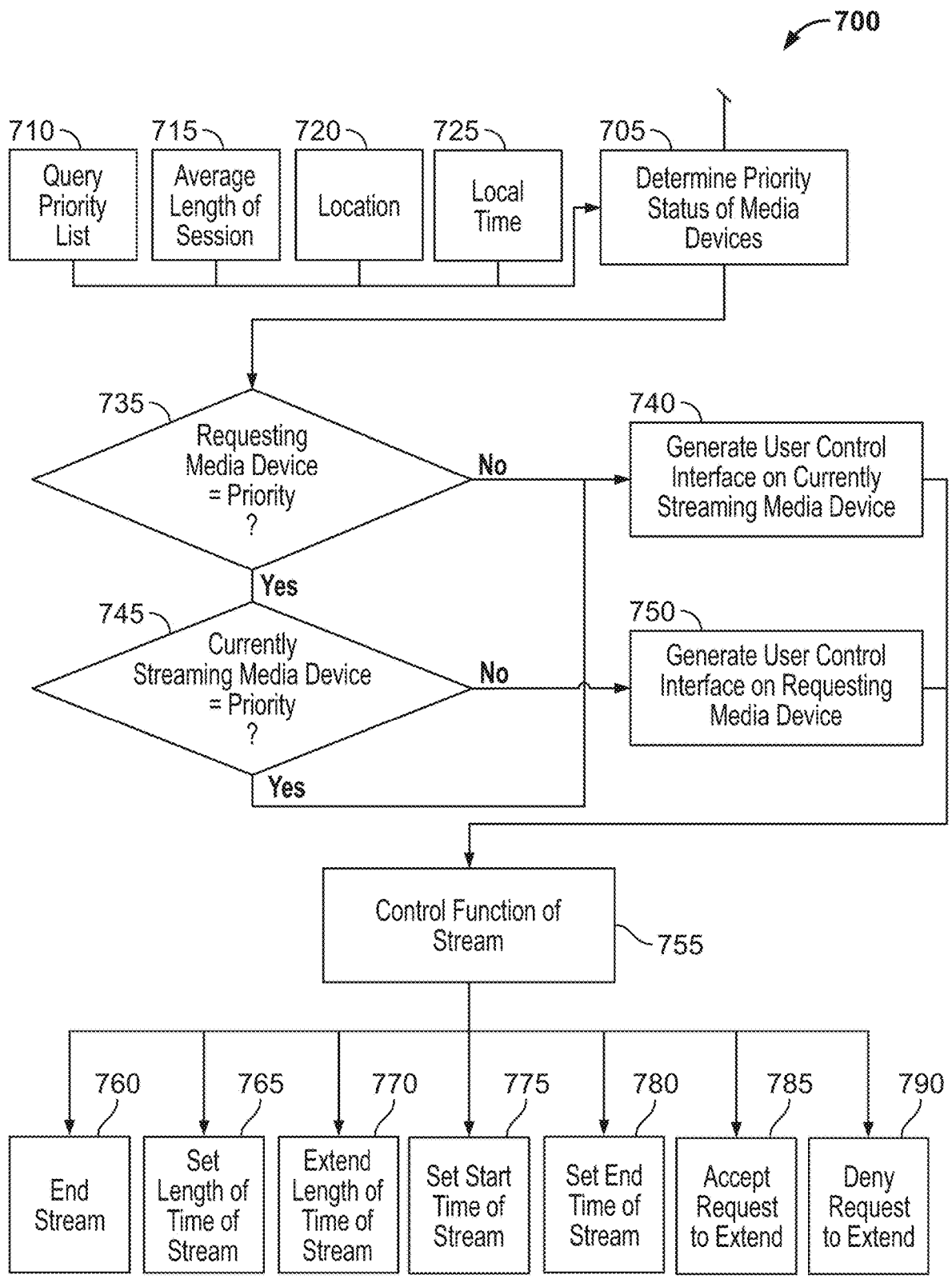
FIG. 7 depicts a method for controlling delivery of media content based on a priority status or a non-priority status of a media device, according to an exemplary embodiment.
Figure 13:
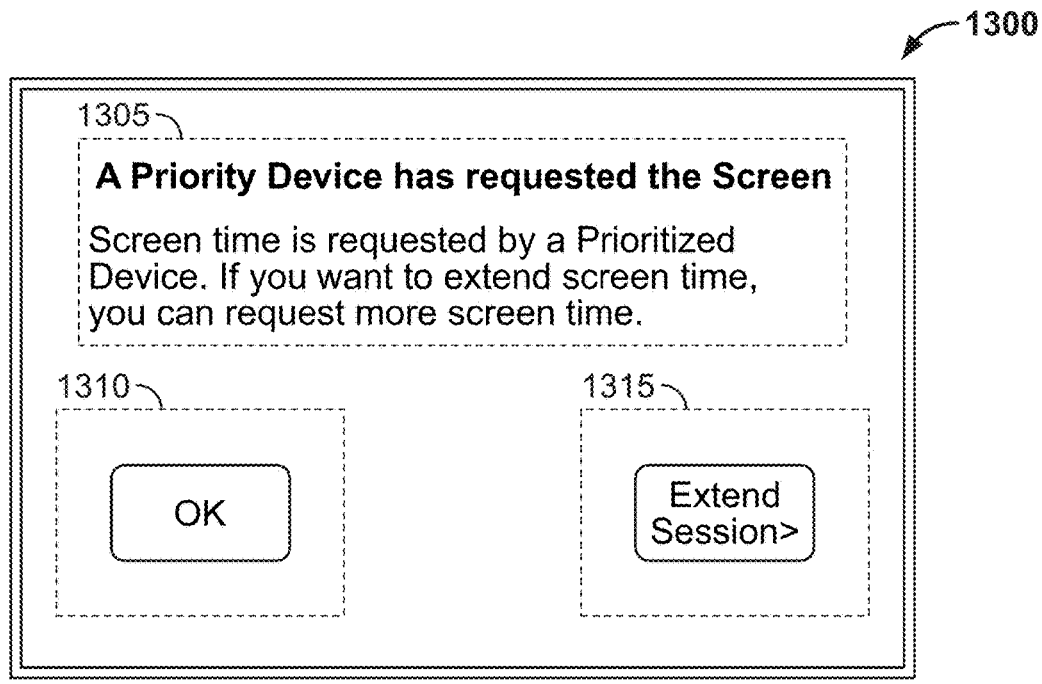
FIG. 13 depicts a graphical user interface (GUI) screen for display on a media device, according to an exemplary embodiment.

In some exemplary embodiments, a device is listed as a priority device on a priority list (e.g., FIGS. 7 and 13). In some exemplary embodiments, the priority list is limited to four devices (the examples, below). If a priority device attempts to access the account or subscription, then one or more non-priority devices are prompted to perform an action including giving up access to the stream or requesting a session extension. The request is displayed to one or more of the priority devices, or exclusively to the owner or primary user of the account or subscription, who can decide whether to accept or deny the request. Thus, the owner, authorized user, or primary user has additional options for control of the account or subscription and an ability to improve a user experience of all users.

Figure 5:
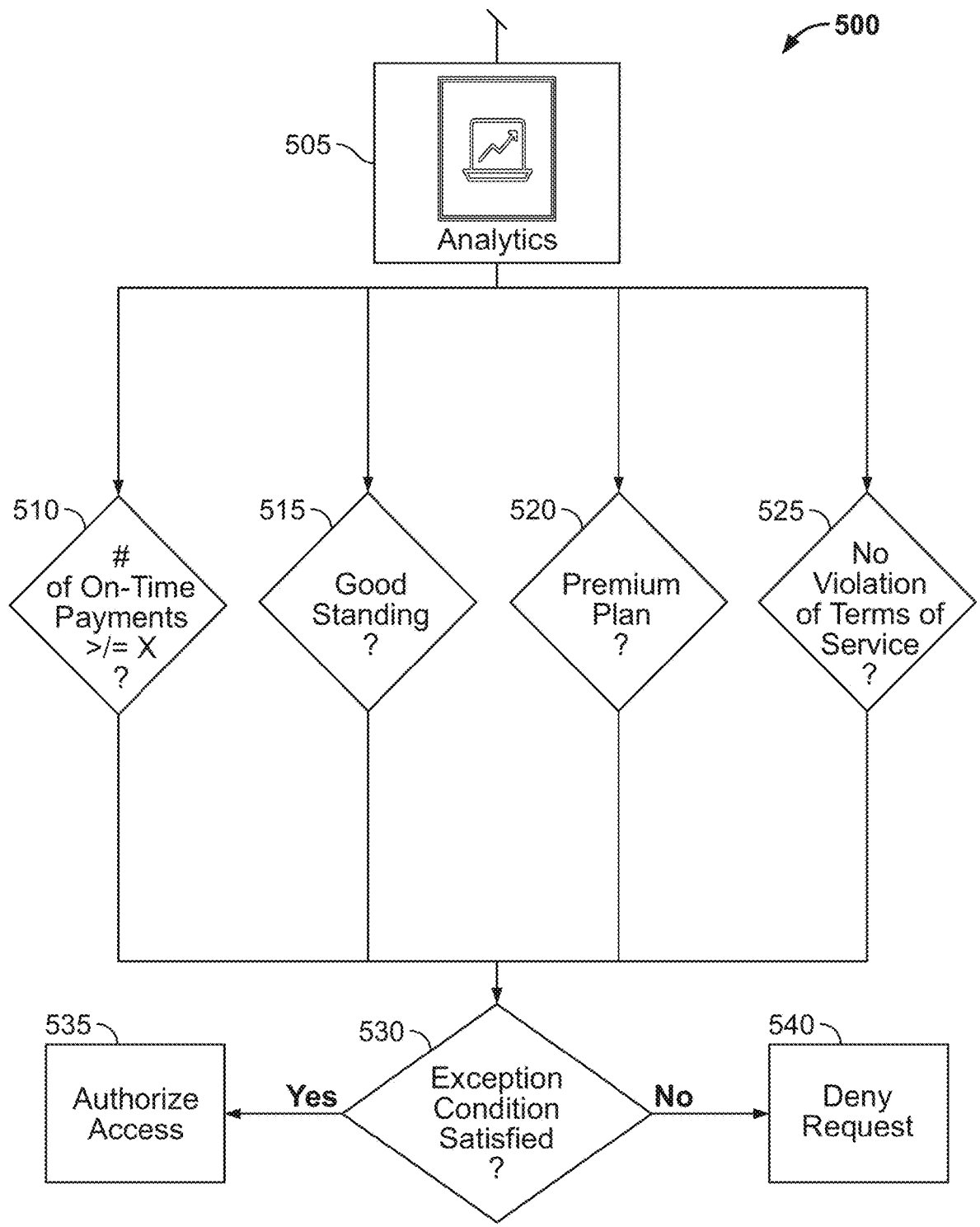
FIG. 5 depicts a method for determining whether an exception to a streaming limit should be granted, according to an exemplary embodiment.

In one exemplary embodiment, when a device cannot stream a content item because a screen limit or a set number of authorized users has been reached, the service grants access to the streaming device based on the account or subscription history (e.g., frequently in good standing, frequently paying on or ahead of time, loyal customer, long-term customer, customer with many referrals, premium subscription, other forms of favorable behavior, and the like) (e.g., FIG. 5).

For example, if the account or subscription is subscribed to a "premium" plan, which allows a maximum of, e.g., four devices to stream at the same time, then the service is configured to retrieve a list of content items currently being streamed by the exemplary four devices and ranking each stream based on how far along into the content item the user has gone (e.g., one device might finish the movie in 15 minutes); and/or how likely the user is to watch another item by analyzing viewing patterns, whether the user and/or media device 109, 127, 137 has a history of binge-watching (for example, device Alpha is currently streaming an episode of a show and device Alpha normally watches two episodes of the show whenever the show is accessed); as well as the type of devices that are currently streaming (e.g., phone, smart TV, and the like). Based on this historical data, the system 100 predicts (e.g., using the predictive model 650) that there is a high likelihood the user will finish a viewing session 20 minutes (in this example, 20 minutes before the end of the second episode of the show having this pattern). The system 100 is configured to download to a storage device 113, 131, 139. In some exemplary embodiments, the system 100 is configured to cache in the storage device 113, 131, 139 as little content as possible. So, in this example, when the system 100 is configured to predict (e.g., using the predictive model 650) a relatively high likelihood that 20 minutes are left in the user's session, and no other user has a predicted session of a shorter length, then the system 100 is configured to download the remaining content to a non-streaming storage, e.g., the storage device 113, 131, 139 of the media device 109, 127, 137, or some other storage means that does not otherwise burden the streaming service 103, such as cloud-based storage 199. This also minimizes the burden on the system 100 for both delivering streaming content and providing content for download and minimizes the impact on the non-streaming storage. Local downloads and/or re-streaming of downloads on a local network between media devices (e.g., 109, 127, 137) emulates a user interface stream from the server 101 without using further resources of the server 101 or an external network such as the streaming service 103.

The system 100 is configured to use historical data to determine, for example, what content is being consumed by which users on which devices at what time, for what duration, what impact this has on the other users based on the account or subscription status or terms and direct a corrective action to anticipate or prevent a maximum usage scenario that would otherwise result in kicking a user off the service.

In some exemplary embodiments, a streaming provider temporarily authorizes (e.g., if status Yes at 235, then authorize 230, 435 and the like) an additional stream as a reward for a user or group of users for desirable behavior (e.g., frequently in good standing (515), frequently paying on or ahead of time (510), loyal customer, long-term customer, customer with many referrals, premium subscription (520), other forms of favorable behavior (e.g., no violations of the terms of service 525), and the like) and/or in a situation where granting the additional stream only minimally burdens a component of the streaming service or related component. For example, if one user is watching content on public transportation, the system 100 is configured to minimize interruptions to the user on the bus and instead selects a user watching from home via Wi-Fi connection, as that user may have relatively superior ability or capacity to download content to a storage device 113, 131, 139. In some exemplary embodiments, the system 100 analyzes each device connected to the streaming service 103 to determine information including the type of connection, the speed of the connection, the resolution of the output, the size of storage device 113, 131, 139, and the like, to determine which user is to be selected for modification.

In some exemplary embodiments, the service is configured to determine whether to download one or more portions of a content item that is currently being streamed in the background. In some exemplary embodiments, the service is configured to seamlessly switch a viewing session from streaming to local play control (e.g., after a portion of the content has been downloaded in the background). For example, a user's media device 109, 127, 137 is configured with a buffer configured to deliver content. The buffer is configured with two thresholds, a first, lower threshold (e.g., X megabytes (MBs)) is used when streaming (for example, to allow pause, rewind and/or other forms of "trick-mode" functionality), and a second, relatively higher threshold (X+Y MBs) when it is determined that the user will be switched from streaming to playing content that is locally stored (e.g., content stored on the device's NAND Flash memory). In such case, the system 100 is configured to ask the user to extend a buffer on the user's media device 109, 127, 137 to meet the second threshold, while the background downloading occurs. The extra buffer allows for seamless transition from streaming to local play control.

The trick-mode may include one or more functions or features of content play control including, for example, TiVo Corporation's TrickPlay functionality. These functions or features include play, fast-forward, instant replay, rewind, others described here, and the like. A play function includes a function to continue watching a media content item. The play function may include returning to or resuming normal speed after rewinding or fast-forwarding. A pause function includes pausing live television for a time period (e.g., up to 30 minutes). A rewind function includes pressing rewind a first time to initiate rewind at an initial speed, a second time to rewind faster, a third time to rewind at triple speed, and the like. A fast-forward function includes advancing through a recorded show at a higher rate. The rewind or fast-forward functions may be selected multiple times, e.g., up to three times for three different speeds where a fourth press resumes playing at a normal rate. In some implementations, fast-forward and rewind speeds have three levels, e.g., 3×, 20×, and 60× the speed of normal television. An instant replay feature may include a jump-back feature which skips backward in the content item by a predetermined time, e.g., 8 seconds. The jump-back feature is useful, for example, when a user misses a show, misses some dialogue, or fast-forwards too far. A slow-motion feature includes playing at a slower rate, e.g., one fifth of real time. An advance feature includes instantly moving forward or skipping ahead by a predetermined time, e.g., 30 seconds. A jump to the end feature or a jump to the beginning feature includes, in some implementations, holding a button on a remote for a predetermined time, e.g., two seconds. A skip mode function includes, in some implementations, differentiation between show content and commercial content. Using skip mode, a media device receives a selection from the user to view content, the selection including a button interface, e.g., a channel up button (or an on-screen icon) configured to trigger a skip to a next section of a media content item, and a channel down button (or an on-screen icon) configured to trigger a return to a previous section of the media content item.

In some exemplary embodiments, the system 100 includes a buffer configured to handle a transition from streaming to local play control. The buffer is configured with a threshold to permit consumption of media by an additional device 137 above the number of devices set by the account or subscription. The system 100 is configured to download content in the background (e.g., to fill a buffer with content, to download content to memory or a persistent storage, and the like) prior to or during consumption, and to switch play control automatically from streaming to local. The system 100 is configured to pre-fetch as much content as possible. The determination of how much to pre-fetch is made taking into consideration network capabilities.

In one exemplary embodiment, access to an additional device 137 not otherwise authorized according to the account or subscription is granted if the system 100 determines that the additional device 137 would be streaming from a server that is not serving a maximum number of sessions or users. That is, the server is configured to permit access to a stream by one or more additional users when the server is not operating during a peak time period or at peak load. The peak load consideration is independent from or combined with the good standing or desirable behavior considerations discussed herein. The media device receives a user notification that such additional functionality is temporarily granted providing an additional reinforcement for the desirable behavior considerations.

In some exemplary embodiments, an additional device 137 might request access to a two-hour movie at a time where a content delivery network (CDN) is not experiencing a high load (i.e., is in a quiet period). The service is configured to allow the user to only stream content during a relatively low load period based on one or more of the following conditions: use of a particular server, the user's location, a relatively inexpensive cost associated with connecting to and moving data from the particular server to the user's location. Conversely, if one or more of the conditions is determined not to be favorable to permitting the additional stream to the additional device 137, then the system 100 prompts the pre-fetch or download mode of the content to a local device and/or playing and/or streaming the content to another device that is not subject to unfavorable conditions. Thus, a need for a server to have relatively high speed or bandwidth is reduced. Independently or additionally, the service is configured to signal to the media device of the user that streaming of the content item is about to end, to disable trick-play functionality, or to perform other actions that reinforce the maximum screen policy, in some exemplary embodiments, for relatively short periods of time. For instance, the system 100 is configured to provision an additional stream for a determined period of time (e.g., five minutes), because the system 100 is configured to predict that one of the devices is likely to log out within the determined period of time.

The system 100 is configured to auto-download content to a mobile device. The system 100 is configured to monitor a streaming status of one, more, or all devices authorized to access the account or subscription. Content items that are automatically downloaded are based on the user's profile or contract 107 (e.g., new episodes of a show, a new movie that a recommendation service determines to likely be of interest to the user, and the like). In one exemplary embodiment, if the additional device 137 is a mobile device, then the service is configured to check whether the mobile device has already downloaded any content and display a list of previously downloaded content items available for selection and play control.

In one exemplary embodiment, if the user is accessing the service from a connected device that does not support auto-download functionality, then the service is configured to present to the media device of the user a list of devices that have content already downloaded to the device as well as the content items that were downloaded, thus allowing the media device of the user to play one of the content items if such device is available for streaming. However, if the downloaded content is present on a device that is currently streaming content, then the system 100 is configured not to display this device or the content items downloaded to the device since the device is already being used for streaming. Also, independently or in combination with this functionality, the system 100 or the device is configured to automatically cast content from the mobile device to the connected device.

In one exemplary embodiment, the system 100 is configured to predict a condition conducive to downloading or pre-fetching content. For example, in response to a determination of a time of day (e.g., the time corresponding with a peak usage period based on historic data), the system 100 is configured to start downloading content in the background of one or more devices. In other words, the system 100 or a device is configured to download content to facilitate a seamless switch from streaming to local play control based on a particular condition such as the time of the day. For example, the system 100 is configured to access historical data about media device of the users and peak usage times, and automatically download the content being streamed before a specific time (e.g., 7:00 p.m.). The system 100 is configured to predict based on historical data that many media devices of the users will be using the service at a particular time in the future. In one exemplary embodiment, the system 100 is configured to disable trick-play functionality (e.g., fast-forward, or rewind) while content is being downloaded in the background to seamlessly switch from streaming to local play control.

In one exemplary embodiment, a signal to initiate download or pre-fetch mode is provided in a tag of a manifest of the content item being streamed. For example, a device communicating with a streaming service 103 receives a signal from the service to initiate the download or pre-fetch mode. For example, the system 100 is configured to determine that a device is expected to stream content up to 6:50 p.m., then the device is configured to start downloading a remaining portion of the content item with enough time to complete the download within the known availability for streaming. In some exemplary embodiments, the system 100 is configured to predict (e.g., using the predictive model 650) that there is a determined likelihood that the media device of the user will or will not complete a session for viewing an entire content item. In a scenario where the system 100 predicts (e.g., using the predictive model 650) a relatively high likelihood that the media device of the user will complete the entire content item, and the availability of the stream (due to, for example, a limit on the number of simultaneous streams associated with the account or subscription) is expected to expire before the end of the content item, the system 100 triggers the download or pre-fetch mode.

A predictive model 650 is trained with one or more of usage data, a hard rule, a predetermined model, a user-defined rule, a rule defined by the content provider, network availability, available speed or bandwidth, and the like (e.g., FIG. 6).

In one exemplary embodiment, the system 100 is configured to determine if a control policy (such as a parental control policy) will be enforced at a future time on any of the devices (e.g., a parent sets a rule that a child's service cannot stream past 10:00 p.m.). The system 100 is configured to permit an additional device 137 to start streaming content if the time at which the stream was requested is within Z-minutes of 10:00 p.m. The system 100 is configured to enforce the control feature at 10:00 p.m. and prevent the other device from streaming any content after the time period, which reinforces the exemplary maximum screen limit policy associated with the account or subscription. The control policy consideration is independent from or combined with the good standing or desirable behavior considerations discussed herein.

In one exemplary embodiment, the system 100 is configured to set a limit on how many times a given number of devices are used at the same time in excess of the limit set forth in the account or subscription (e.g., an exception is granted twice during one billing period), which reinforces the screen limit policy and limits access to additional device(s) 137 until one of the maximum number of devices stops streaming.

The analyzing of the status (235) includes one, more, or all the features of process 300 (FIG. 3), process 400 (FIG. 4), process 500 (FIG. 5), process 600 (FIG. 6), and process 700 (FIG. 7).

Figure 3:
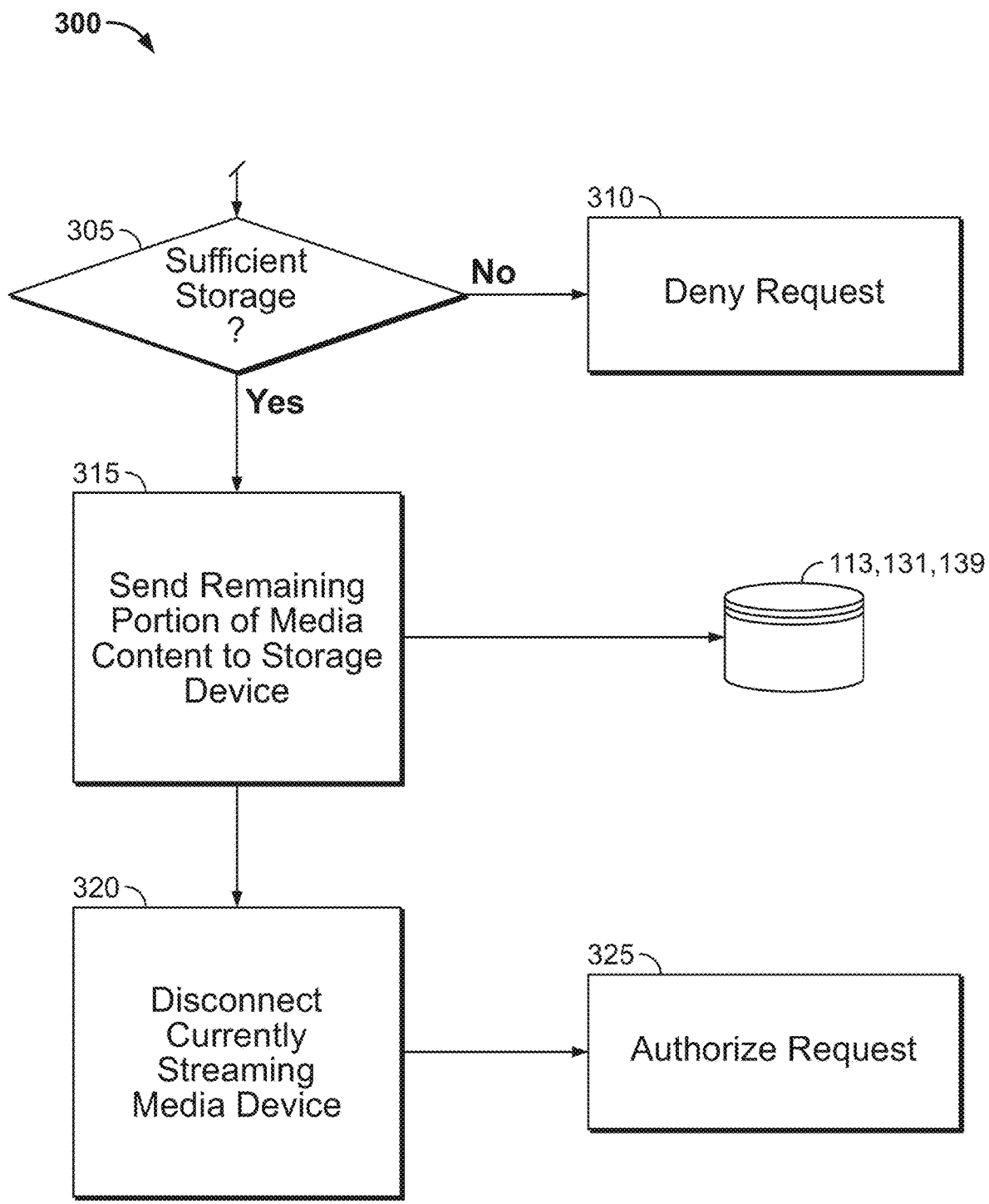
FIG. 3 depicts a method for freeing up a stream for an additional media device using a storage device, according to an exemplary embodiment.

As shown in FIG. 3, in one exemplary embodiment, the analyzing of the status (235) includes the process 300. The process 300 includes determining that a storage device 113, 131, 139 has sufficient storage to store a remaining portion of the media content item 665 playing on the currently streaming media device 109, 127, 137 (305). In some embodiments, the determining 305 that the storage device 113, 131, 139 has sufficient storage to store the remaining portion of the media content item 665 playing on the currently streaming media device 109, 127, 137 is storage authorized by an application of the streaming service. Also, the media device of the user may receive a prompt to authorize additional storage for the remaining portion. Insufficient storage results in a denial of the request (310). The analyzing of the status (235) includes sending the remaining portion to the storage device 113, 131, 139 (315). Thereafter the analyzing of the status (235) includes disconnecting the currently streaming media device 109, 127 from the streaming service 103, thereby freeing up a stream and cause the number of currently streaming media devices to be less than or equal to the maximum number (320) and lead to an authorization of the request (325).

Figure 4:
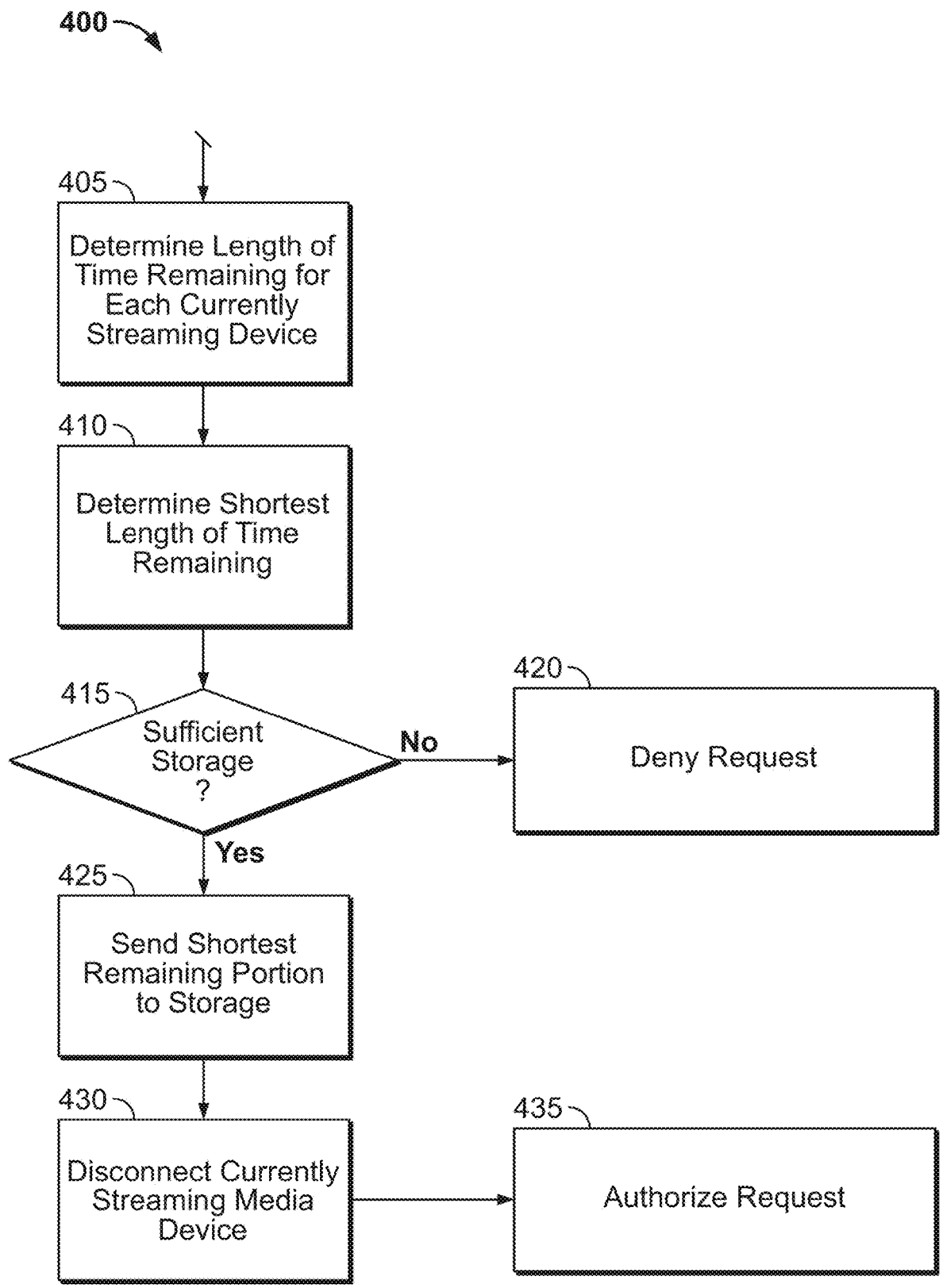
FIG. 4 depicts a method for freeing up a stream using for an additional media device using a storage device, according to an exemplary embodiment.

As shown in FIG. 4, in one exemplary embodiment, the analyzing of the status (235) includes the process 400 including determining, for each of the currently streaming media devices, a length of time remaining for the media content item 665 (405). The analyzing of the status (235) includes identifying the currently streaming media device 109, 127 of the currently streaming media devices having a shortest length of time remaining for the media content item 665 (410). The analyzing of the status (235) includes determining that a storage device 113, 131, 139 has sufficient storage to store a remaining portion of the media content item 665 playing on the currently streaming media device 109, 127 having the shortest length of time remaining (415). Insufficient storage results in a denial of the request (420). The analyzing of the status (235) includes sending the remaining portion to the storage device 113, 131, 139 (425). The analyzing of the status (235) includes disconnecting the currently streaming media device 109, 127 having the shortest length of time remaining (430). By disconnecting the currently streaming media device 109, 127 having the shortest length of time remaining, a stream is freed up and the request is authorized (435). That is, disconnecting the currently streaming media device 109, 127 having the shortest length of time remaining causes the number of currently streaming media devices to be less than or equal to the maximum number.

Please note, in FIGS. 3 and 4 and other exemplary embodiments, the local downloads and/or the re-streaming of the downloads on the local network between devices (e.g., 113, 131, 139) emulates the user interface stream from the server 101 without using further resources of the server 101 or the external network such as the streaming service 103.

As shown in FIG. 5, in one exemplary embodiment, the analyzing of the status (235) includes the process 500 including analyzing consumption patterns of the media device 109, 127, 137 and associated with the profile or contract 107 to determine that an exception condition is satisfied (505). The number and type of exception conditions are not limited to those illustrated in FIG. 5 and include any of the examples disclosed herein and their equivalents. For example, one or more features of any of the processes depicted in FIGS. 2-4, 6, and 7 may represent the exception condition. For example, the predictive model 650 of FIG. 6, which performs analysis based on hard rules, learning rules, hard models, learning models, usage data, load data, analytics of the same, metadata, profile information, and the like, may represent the exception condition.

In some exemplary embodiments, the exception condition is satisfied (Yes at 530) in response to determining that a number of consecutive on-time payments for a subscription to the streaming service 103 meets or exceeds a predetermined number (510). The exception condition is satisfied (Yes at 530) in response to determining that the subscription is in good standing (515). The exception condition is satisfied (Yes at 530) in response to determining that the subscription is a premium plan (520). The exception condition is satisfied (Yes at 530) in response to determining that no violation of terms of service of the subscription has occurred (525). If at least one exception condition is satisfied (Yes at 530), then the request is authorized (535). If one, more, or all the exception conditions are not satisfied (No at 530), then the request is denied (540).

The method 200 does not require prior authorization of the requesting media device 137, setting a home network, performing a mobile check-in, CAPTCHA or inputting of an access code. Thus, the method 200 minimizes frustrating the user, is user-friendly, and is relatively less time-consuming than prior methods.

The analyzing of the status (235) includes a prediction process 600. The analyzing of the status (235) utilizes a predictive model 650 in some embodiments. The predictive model 650 receives as input various forms of data about one, more or all the devices described in the present disclosure. The predictive model 650 performs analysis based on hard rules, learning rules, hard models, learning models, usage data, load data, analytics of the same, metadata, profile information, and the like. The predictive model 650 outputs one or more predictions of a future state of any of the devices described in the present disclosure.

The method 200 includes predicting, with the predictive model 650, an impact of the addition of the requested stream on the status of the streaming service 103 (655), the requesting media device 137 (660), the media content item 665, the communication system or network 806 (670), the profile or contract 107 (675), or the currently streaming media device 109, 127 (680). The analyzing of the status (235) includes determining whether one, more or all the impacts referenced herein satisfy a predetermined standard (690).

The analyzing of the status (235) includes disabling a load-increasing function of the stream (685). The load-increasing function is any function identified by load-balancing techniques, e.g., least connection, least bandwidth, round robin, server response time, weighted versions of the same, resource-based techniques, and address hashing.

In some exemplary embodiments, the method 200 includes reducing a load on the streaming service 103. The method 200 includes reducing a load on the requesting media device 137. The method 200 includes reducing a load on the communication system or network 806. The method 200 includes reducing a load on the currently streaming media device 109, 127. The method 200 includes determining that the load after the disabling satisfies a predetermined standard (690). The load-increasing function is a trick-mode (see full description herein) in some implementations. Specifically, for example, the system is configured to disable fast-forward, instant replay, rewind, a function to continue watching a media content item from a previous stopping point on another device, returning to or resuming normal speed after rewinding or fast-forwarding, pausing live television for a time period, pressing rewind a first time to initiate rewind at an initial speed, a second time to rewind faster, a third time to rewind at triple speed, and the like, advancing through a recorded show at a higher rate, selecting the rewind or fast-forward functions multiple times, e.g., up to three times for three different speeds where a fourth press resumes playing at a normal rate, disabling fast-forward and rewind speeds at three levels, e.g., 3×, 20×, and 60× the speed of normal television, an instant replay feature, a jump back feature which skips backward in the content item by a predetermined time, a slow motion feature, an advance feature, a jump to the end feature or a jump to the beginning feature, holding a button on a remote for a predetermined time, differentiation between show content and commercial content, a skip mode, selecting a channel up button (or an on-screen icon) to skip to a next section of a media content item, a channel down button (or an on-screen icon) to return to a previous section of the media content item, and the like. One or more of these functions may be suspended for a period of time.

The predictive model 650 is based on input including one or more of a hard rule (605), a user-defined rule (610), a rule defined by the streaming service 103 (615), a hard model (620), and a learning model (625).

The predictive model 650 receives as input usage data (630). The predictive model 650 is based on one or more of a usage pattern of the streaming service 103, a usage pattern of the requesting media device 137, a usage pattern of the media content item 665, a usage pattern of the communication system or network 806, a usage pattern of the profile or contract 107, and a usage pattern of the currently streaming media device 109, 127.

The predictive model 650 receives as input load-balancing data (635). The predictive model 650 is based on one or more of load data of the streaming service 103, load data of the requesting media device 137, load data of the media content item 665, load data of the communication system or network 806, load data of the profile or contract 107, and load data of the currently streaming media device 109, 127.

The predictive model 650 receives as input metadata (640). The predictive model 650 is based on one or more of metadata of the streaming service 103, metadata of the requesting media device 137, metadata of the media content item 665, metadata of the communication system or network 806, metadata of the profile or contract 107, and metadata of the currently streaming media device 109, 127. The metadata may include information of the type represented by the media device manifest 149 in FIG. 1C.

In some exemplary embodiments, the predictive model 650 is trained with data. The training data is developed in some exemplary embodiments using one or more data techniques including but not limited to data selection, data sourcing, and data synthesis. The predictive model 650 is trained in some exemplary embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 650 is trained in some exemplary embodiments with one or more machine learning approaches including but not limited to supervised learning, unsupervised learning, semi-supervised learning, reinforcement learning, and dimensionality reduction. The predictive model 650 in some exemplary embodiments includes regression analysis including analysis of variance (ANOVA), linear regression, logistic regression, ridge regression, and/or time series. The predictive model 650 in some exemplary embodiments includes classification analysis including decision trees and/or neural networks. In FIG. 6, a depiction of a multi-layer neural network is provided as a non-limiting, exemplary predictive model 650, the exemplary neural network including an input layer (left side), three hidden layers (middle), and an output layer (right side) with 32 neurons and 192 edges, which is intended to be illustrative, not limiting. In some exemplary embodiments, the predictive model 650 is based on data engineering and/or modeling techniques. The data engineering techniques include exploration, cleaning, normalizing, feature engineering, and scaling. The modeling techniques include model selection, training, evaluation, and tuning. The predictive model 650 is operationalized using registration, deployment, monitoring, and/or retraining techniques.

In some exemplary embodiments, the predictive model 650 is configured to output a prediction 681 and/or a future state 683 of one or more of, e.g., the system 1, the server 2, the communication system 3, the streaming service 5, the existing stream 7, 11, the media device 13, the media device 17, the media device 19, the local memory 47, the local network 53, casting 67, 73, the bonus stream 97, the system 100, the server 101, the streaming service 103, the profile or contract 107, the first media device 109, the second media device 127, the n-th media device 137, the storage device 113, the storage device 131, the storage device 139, the manifest 149, the storage device 199, the streaming service 655, the requesting media device 660, the media content item 665, the communication system or network 670, the currently streaming media device 680, and the like.

As shown in FIG. 7, in one exemplary embodiment, the analyzing of the status (235) includes the process 700 including determining that the requesting media device 137 has a priority status (Ys at 735). The analyzing of the status (235) includes determining that the requesting media device 137 does not have a priority status (No at 735). The analyzing of the status (235) includes determining that the currently streaming media device 109, 127 has a priority status (Yes at 745). The analyzing of the status (235) includes determining that the currently streaming media device 109, 127 does not have a priority status (745=No).

The method 200 includes, in response to determining that the requesting media device 137 has a priority status (735=Yes), determining the priority status of the currently streaming media device 109, 127 (745). The method 200 includes, in response to determining that the currently streaming media device 109, 127 does not have the priority status (745=No), generating for display the user control interface on the requesting media device 137 having the priority status (750). The method 200 includes, in response to determining that the currently streaming media device 109, 127 also has the priority status (745=Yes), generating for display the user control interface on the currently streaming media device 109, 127 (740). The method 200 includes, in response to determining that the requesting media device 137 does not have the priority status (735=No), generating for display the user control interface on the currently streaming media device 109, 127 (740).

The user control interface includes selectable options to control a function of the stream of any currently streaming media device 109, 127 (755). The function is one or more of ending the stream (760), setting a length of time of the stream (765), extending a length of time of the stream (770), setting a start time of the stream (775), setting an end time of the stream (780), accepting a request to extend a length of time of the stream (785), and denying a request to extend a length of time of the stream (790).

The priority status is determined (705) based on one or more of a query of a priority list of media devices stored in the profile or contract 107 (710), an average length of time for a continuous session of the media content item 665 playing on each media device 109, 127, 137 (715), a location of the media device 109, 127, 137 (720), and a local time of the media device 109, 127, 137 (725).

The analyzing of the status (235) includes generating for display a user control interface (740, 750). The user control interface includes a selectable option to end a streaming session of any currently streaming media device 109, 127 (760).

The system 100 for controlling delivery of media content includes delivery of the media content from a streaming service 103 to a media device 109, 127, 137 through a communication system or network 806 (FIG. 8). The system 100 includes control circuitry 834. The control circuitry 834 is configured to perform one, more, or all the features referenced herein of the method 200, process 300, process 400, process 500, process 600, and process 700 in any suitable combination.

A non-transitory, computer-readable medium having non-transitory, computer-readable instructions encoded thereon is provided. The non-transitory computer-readable medium is provided for controlling delivery of media content. The non-transitory, computer-readable medium is provided for controlling delivery of media content from a streaming service 103 to a media device 109, 127, 137 through a communication system or network 806. The instructions, when executed by control circuitry 834, may cause the control circuitry 834 to perform one, more, or all the features referenced herein of the method 200, process 300, process 400, process 500, process 600, and process 700 in any suitable combination.

A device is configured for controlling delivery of media content. The device includes means for performing one, more, or all the features referenced herein of the method 200, process 300, process 400, process 500, process 600, and process 700 in any suitable combination. The device is one of a server, a smartphone, a tablet, a network-connected computer, and any other type of user equipment, media device, and computing device.

FIG. 8 depicts a block diagram representing exemplary media content delivery control system 800, in accordance with some exemplary embodiments. The system is shown to include computing device 802, server 804, and a communication network 806. It is understood that while a single instance of a component may be shown and described relative to FIG. 8, additional instances of the component may be employed. For example, server 804 may include, or may be incorporated in, more than one server. Similarly, communication network 806 may include, or may be incorporated in, more than one communication network. Server 804 is shown communicatively coupled to computing device 802 through communication network 806. While not shown in FIG. 8, server 804 may be directly communicatively coupled to computing device 802, for example, in a system absent or bypassing communication network 806.

Communication network 806 may include one or more network systems, such as, without limitation, Internet, LAN, Wi-Fi, or other network systems suitable for audio processing applications. In some exemplary embodiments, the system of FIG. 8 excludes server 804, and functionality that would otherwise be implemented by server 804 is instead implemented by other components of the system depicted by FIG. 8, such as one or more components of communication network 806. In still other exemplary embodiments, server 804 works in conjunction with one or more components of communication network 806 to implement certain functionality described herein in a distributed or cooperative manner. Similarly, in some exemplary embodiments, the system depicted by FIG. 8 excludes computing device 802, and functionality that would otherwise be implemented by computing device 802 is instead implemented by other components of the system depicted by FIG. 8, such as one or more components of communication network 806 or server 804 or a combination of the same. In other exemplary embodiments, computing device 802 works in conjunction with one or more components of communication network 806 or server 804 to implement certain functionality described herein in a distributed or cooperative manner.

Computing device 802 includes control circuitry 808, display 810 and input/output circuitry 812. Control circuitry 808 may be based on any suitable processing circuitry and includes control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some exemplary embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 808 in turn includes communication circuitry 826, storage 822 and processing circuitry 818. Either of control circuitry 808 and 834 may be utilized to execute or perform any or all the processes or steps depicted in FIGS. 2-7, inclusive, or any combination of steps thereof (e.g., as enabled by processing circuitries 818 and 836, respectively).

In addition to control circuitry 808 and 834, computing device 802 and server 804 may each include storage (storage 822, and storage 838, respectively). Each of storages 822 and 838 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 822 and 838 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 822 and 838 or instead of storages 822 and 838. In some exemplary embodiments, a user profile and messages corresponding to a chain of communication may be stored in one or more of storages 822 and 838. Each of storages 822 and 838 may be utilized to stored commands on behalf of the QSA, for example, such that when each of processing circuitries 818 and 836, respectively, are prompted though control circuitries 808 and 834, respectively, either of processing circuitries 818 or 836 may execute any of the processes and examples depicted in FIGS. 2-7, or any combination of steps thereof.

In some exemplary embodiments, control circuitry 808 and/or 834 executes instructions for an application stored in memory (e.g., storage 822 and/or storage 838). Specifically, control circuitry 808 and/or 834 may be instructed by the application to perform the functions discussed herein. In some implementations, any action performed by control circuitry 808 and/or 834 may be based on instructions received from the application. For example, the application may be implemented as software or a set of and/or one or more executable instructions that may be stored in storage 822 and/or 838 and executed by control circuitry 808 and/or 834. In some exemplary embodiments, the application may be a client/server application where only a client application resides on computing device 802, and a server application resides on server 804.

The application may be implemented using any suitable architecture. For example, it may be a stand-alone application wholly implemented on computing device 802. In such an approach, instructions for the application are stored locally (e.g., in storage 822), and data for use by the application is downloaded on a periodic basis (e.g., from an out-of-band feed, from an Internet resource, or using another suitable approach). Control circuitry 808 may retrieve instructions for the application from storage 822 and process the instructions to perform the functionality described herein. Based on the processed instructions, control circuitry 808 may determine a type of action to perform in response to input received from input/output circuitry 812 or from communication network 806.

In client/server-based embodiments, control circuitry 808 may include communication circuitry suitable for communicating with an application server (e.g., server 804) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 806). In another example of a client/server-based application, control circuitry 808 runs a web browser that interprets web pages provided by a remote server (e.g., server 804). For example, the remote server may store the instructions for the application in a storage device.

The remote server may process the stored instructions using circuitry (e.g., control circuitry 834) and/or generate displays. Computing device 802 may receive the displays generated by the remote server and may display the content of the displays locally via display 810. For example, display 810 may be utilized to present a string of characters corresponding to suggestions as shown in FIG. 7. This way, the processing of the instructions is performed remotely (e.g., by server 804) while the resulting displays, such as the display windows described elsewhere herein, are provided locally on computing device 804. Computing device 802 may receive inputs from the user via input/output circuitry 812 and transmit those inputs to the remote server for processing and generating the corresponding displays.

Alternatively, computing device 802 may receive inputs from the user via input/output circuitry 812 and process and display the received inputs locally, by control circuitry 808 and display 810, respectively. For example, input/output circuitry 812 may correspond to a keyboard and/or a set of and/or one or more speakers/microphones which are used to receive user inputs (e.g., input as displayed in a search bar a display representing display 810 of FIG. 8 on a computing device). Input/output circuitry 812 may also corresponds to a communication link between display 810 and control circuitry 808 such that display 810 updates in response to inputs received via input/output circuitry 812 (e.g., simultaneously update what is shown in display 810 based on inputs received by generating corresponding outputs based on instructions stored in memory via a non-transitory computer-readable medium).

Server 804 and computing device 802 may transmit and receive content and data such as media content via communication network 806. For example, server 804 may be a media content provider, and computing device 804 may be a smart television configured to download or stream media content, such as a live news broadcast, from server 804. Control circuitry 834, 808 may send and receive commands, requests, and other suitable data through communication network 806 using communication circuitry 832, 826, respectively. Alternatively, control circuitry 834, 808 may communicate directly with each other using communication circuitry 832, 826, respectively, avoiding communication network 806.

It is understood that computing device 802 is not limited to the embodiments and methods shown and described herein. In nonlimiting examples, computing device 802 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 802 receives user input 814 at input/output circuitry 812. For example, computing device 802 may receive a user input such as a user swipe or user touch. It is understood that computing device 802 is not limited to the embodiments and methods shown and described herein.

User input 814 may be received from a user selection-capturing interface that is separate from device 802, such as a remote-control device, trackpad, or any other suitable user movement-sensitive, audio-sensitive or capture devices, or as part of device 802, such as a touchscreen of display 810. Transmission of user input 814 to computing device 802 may be accomplished using a wired connection, such as an audio cable, USB cable, ethernet cable or the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 812 may include a physical input port such as an 8.5 mm (0.3346 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 8G, 4G, 4G LTE, 5G, or other wireless transmission protocols.

Processing circuitry 818 may receive user input 814 from input/output circuitry 812 using communication path 816. Processing circuitry 818 may convert or translate the received user input 814 that may be in the form of audio data, visual data, gestures, or movement to digital signals. In some exemplary embodiments, input/output circuitry 812 performs the translation to digital signals. In some exemplary embodiments, processing circuitry 818 (or processing circuitry 836, as the case may be) carries out disclosed processes and methods.

Processing circuitry 818 may provide requests to storage 822 by communication path 820. Storage 822 may provide requested information to processing circuitry 818 by communication path 846. Storage 822 may transfer a request for information to communication circuitry 826 which may translate or encode the request for information to a format receivable by communication network 806 before transferring the request for information by communication path 828. Communication network 806 may forward the translated or encoded request for information to communication circuitry 832, by communication paths 830.

At communication circuitry 832, the translated or encoded request for information, received through communication path 830, is translated or decoded for processing circuitry 836, which will provide a response to the request for information based on information available through control circuitry 834 or storage 838, or a combination thereof. The response to the request for information is then provided back to communication network 806 by communication path 840 in an encoded or translated format such that communication network 806 can forward the encoded or translated response back to communication circuitry 826 by communication path 842.

At communication circuitry 826, the encoded or translated response to the request for information may be provided directly back to processing circuitry 818 by communication path 854 or may be provided to storage 822 through communication path 844, which then provides the information to processing circuitry 818 by communication path 846. Processing circuitry 818 may also provide a request for information directly to communication circuitry 826 though communication path 852, where storage 826 responds to an information request, provided through communication path 820 or 844, by communication path 824 or 846 that storage 822 does not contain information pertaining to the request from processing circuitry 818.

Processing circuitry 818 may process the response to the request received through communication paths 846 or 854 and may provide instructions to display 810 for a notification to be provided to the users through communication path 848. Display 810 may incorporate a timer for providing the notification or may rely on inputs through input/output circuitry 812 from the user, which are forwarded through processing circuitry 818 through communication path 848, to determine how long or in what format to provide the notification. When display 810 determines the display has been completed, a notification may be provided to processing circuitry 818 through communication path 850.

The communication paths provided in FIG. 8 between computing device 802, server 804, communication network 806, and all subcomponents depicted are exemplary and may be modified to reduce processing time or enhance processing capabilities for each step in the processes disclosed herein by one skilled in the art.

EXAMPLES

Example 1A: Mercury implements a bonus screen policy as an exception condition that overrides the four-stream maximum. The system 1 is configured to determine 79 Mom's eligibility for a bonus stream or bonus screen 97. The determination 79 is made by automatically reviewing Mom's payment history, determining that Mom is eligible because Mom made six consecutive, on-time payments, and determining that Mom has not violated any of the terms of service of Mercury (e.g., FIG. 5, herein). Having automatically determined this exception condition is satisfied, the system is configured to automatically deliver 89 a bonus stream or screen 97 to media device 19. Thus, the system 1 is configured to instantaneously grant Grandpa access to King Arthur: Legend of the Sword, i.e., the system 1 temporarily bypasses the four-stream maximum. In some embodiments, eligibility for the bonus stream or bonus screen may be based on one or more of the determinations 29, 37, 225, 235, 305, 415, 510, 515, 520, 525, 530, determinations of the predictive model 650, 690, 735, and 745, described herein.

Example 1B: The system 1 is configured to present the administrators at Mercury with options to add, edit, or delete conditions of a bonus screen program, e.g., change the number of consecutive, on-time payments (e.g., 510, FIG. 5), set a time period for the bonus stream 97, change notifications (e.g., FIGS. 9, 10, 11, and 12), add, edit, or delete conditions of the determinations 29, 37, 59, 79, 225, 235, 305, 415, 510, 515, 520, 525, 530, determinations of the predictive model 650, 690, 735, and 745, and the like.

Example 1C: The automatic review of Mom's payment history occurs periodically, so the system 1 is configured to grant a bonus screen 97 so long as the exception condition is met.

Example 1D: The automatic review of Mom's payment history occurs in response to Grandpa's request to stream King Arthur: Legend of the Sword (or any other media content item).

Example 1E: The automatic review of Mom's payment history occurs in response to Grandpa's login to Mercury with Grandpa's media device 19.

Example 1F: The bonus stream includes generating an instruction to send a notification in the form of a bonus message or notification 911 to Mom (e.g., FIG. 9). The bonus message 911 is sent for display on Mom's currently streaming tablet (e.g., media device 13, 900).

Example 1G: The bonus message 911 includes one or more of fields for display on a screen 907 of the media device 900 including, for example, information 919 identifying conditions that satisfy the exception condition (e.g., "your streak of consecutive on-time payments"); information 929 identifying a maximum number of streams associated with the streaming account (e.g., "4"); information 937 identifying the maximum number of streams associated with the streaming account plus one (e.g., "5"); information 941 identifying a duration for the bonus stream (e.g., "1 month"); and a selectable option 953 to share the earning of the bonus screen to social media, to other media devices linked to the account, via email, and the like. The bonus message 911 of FIG. 9—i.e., "YOU EARNED A BONUS STREAM! As a reward for your streak of consecutive on-time payments, we increased the streaming limit from 4 to 5 devices. (Bonus stream will be available for 1 month.) Thank you for being a loyal customer. Share the good news."—is merely exemplary.

Example 2A: Mom knows Grandpa is coming home in an hour and previously told Mom that Grandpa wants to watch King Arthur: Legend of the Sword that night. Before Grandpa comes home, the system 1 is configured to generate a graphical user interface (GUI) or user control interface on Mom's media device 13 including one or more selectable options to manage one or more of the current streaming sessions of Mom, Dad, Junior, and Grandma, and functions thereof. E.g., FIG. 7.

Example 2B: Mom's GUI is configured with a selectable option to set an end time (e.g., 780, FIG. 7) for each currently streaming media device (e.g., media device 13, 17, 19). It is a school night, and Mom can limit Junior's access to Mercury to sixty minutes.

Example 2C: After Mom sets the sixty-minute limit for Junior's media device, the system is configured to generate a user control interface on Junior's smartphone. The user control interface is configured to send Junior a notification that Junior has sixty minutes left in his streaming session. Junior, upon receiving the notification, has an option to request a session extension. Army of Thieves has a running time of 127 minutes, Junior started watching sixty minutes ago, so Junior needs an additional sixty-seven minutes to complete Army of Thieves in one streaming session. The system 1 is configured to receive Junior's request and send the same to Mom's user interface, which is configured with options to Approve/Accept or Deny Junior's request for the session extension.

Example 3A: The system 1 is configured to predict (with, e.g., the predictive model 650, FIG. 6) a conflict between Mom's sixty-minute restriction and the 127-minute running time of Army of Thieves currently streaming on Junior's media device without interrupting Junior's streaming session. Upon receipt of Mom's limit, the system 1 is configured to look up the running time of Army of Thieves and determine that the time remaining in Junior's viewing of Army of Thieves is greater than the restriction set by Mom thus identifying a conflict.

Example 3B: The system 1 is configured to transmit to Mom's user interface a notification that there is a conflict requiring resolution, specifically, Junior needs sixty-seven more minutes to complete Army of Thieves in one streaming session. Mom may extend the session permitting Junior to enjoy Army of Thieves in a single session without interruption.

Example 3C: The system 1 is configured to automatically resolve the conflict by one or more of the pre-fetching operations disclosed herein.

Example 3D: Without user intervention, the system 1 is configured to assess all four current streaming sessions (e.g., 7, 11, . . . ), determine a time remaining on each streaming session, determine a shortest of the times remaining (e.g., 59), send the remaining portion of the shortest content stream to a storage device (e.g., send the content 43 to the local memory 47; and/or cause the media device 13 to download the content 61; and/or cause the media device 17 to download the content 71), and automatically authorize Grandpa's request 23. The storage device may be a locally connected storage device such as the storage device 113, 131, 139 (FIGS. 1C and 3), of each of the devices 109, 127, 137 (FIG. 1C), respectively, or an external storage device (e.g., local memory 47, FIG. 1A, or storage device 199, FIG. 1C).

Example 4A: Grandpa gets home and requests King Arthur: Legend of the Sword.

Without any further user intervention, the system 1 is configured to assess all four current streaming sessions (e.g., 7, 11, . . . ), determine a time remaining on each streaming session, determine a shortest of the times remaining (e.g., 59), send the remaining portion of the shortest content stream to a local memory or storage device (e.g., 47, 113, 131, 139, 199), and automatically authorize Grandpa's request by causing the local memory or storage device to stream content to Grandpa's network-connected computer (e.g., media device 19).

Example 4B: The system 1 is configured to temporarily permit five screens, e.g., the four screens or streams authorized by the contract (e.g., 107) and a bonus screen or stream, until the downloading of the remaining portion is complete (e.g., FIG. 1A, existing streams 7, 11, and the bonus stream 97; and FIG. 1B, existing streams 6, 8, 10, 12, and the approved bonus stream 16).

Example 4C: The downloading determination may result in generating an instruction to send a notification 1013 to Mom (e.g., FIG. 10). The bonus message 1013 is sent for display on Mom's currently streaming tablet (e.g., media device 109 or media device 1000).

Example 4D: The bonus message 1013 includes one or more of fields for display on a screen 1009 of the media device 1000 including, for example, information 1019 identifying an owner of the account (e.g., "Mom"); information 1039 identifying a stream subject to local download (e.g., "Junior's stream"); information 1033 identifying conditions that satisfy the exception condition (e.g., "your streak of consecutive on-time payments"); and information 1021 identifying a maximum number of streams associated with the streaming account (e.g., "4"); information 1031 identifying the maximum number of streams associated with the streaming account plus one (e.g., "5"). The bonus message 1013 of FIG. 10—i.e., "Hi, Mom. Your subscription includes 4 simultaneous streams. A 5th potential user, Grandpa, requested King Arthur: Legend of the Sword. As a reward for your streak of consecutive on-time payments, to accommodate Grandpa's request, we are downloading the remaining portion of Junior's stream (Army of Thieves) to Junior's smartphone."—is merely exemplary.

Figure 11:
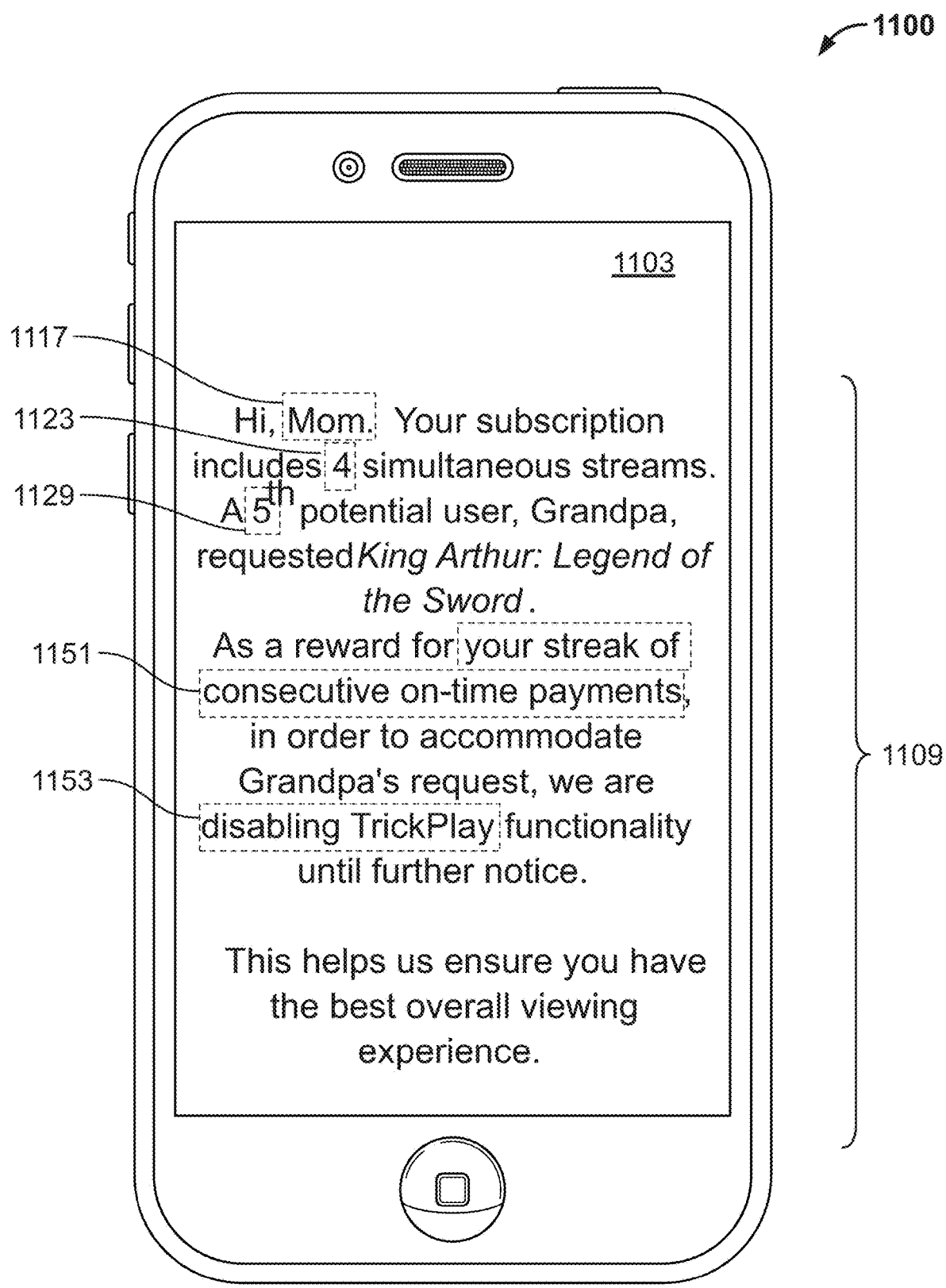
FIG. 11 depicts a download notification icon displayed on a smartphone, according to an exemplary embodiment.

Example 4E: The system 1 is configured to disable a trick-mode (see full description herein) of the streaming service to accommodate Grandpa's request. As shown in FIG. 11, a media device 1100 is configured to display a trick-mode disablement bonus message 1109. The trick-mode disablement bonus message 1109 includes one or more of fields for display on a screen 1103 of the media device 1100 including, for example, information 1117 identifying an owner of the account (e.g., "Mom"); information 1151 identifying conditions that satisfy the exception condition (e.g., "your streak of consecutive on-time payments"); information 1123 identifying a maximum number of streams associated with the streaming account (e.g., "4"); information 1129 identifying the maximum number of streams associated with the streaming account plus one (e.g., "5"); and information 1153 identifying a load-increasing function, e.g., disabling trick-mode including TiVo Corporation's TrickPlay functionality in order to free up a stream for Grandpa. The bonus message 1109 of FIG. 11—i.e., "Hi, Mom. Your subscription includes 4 simultaneous streams. A 5th potential user, Grandpa, requested King Arthur: Legend of the Sword. As a reward for your streak of consecutive on-time payments, to accommodate Grandpa's request, we are disabling TrickPlay functionality until further notice. This helps us ensure you have the best overall viewing experience."—is merely exemplary.

Figure 12:
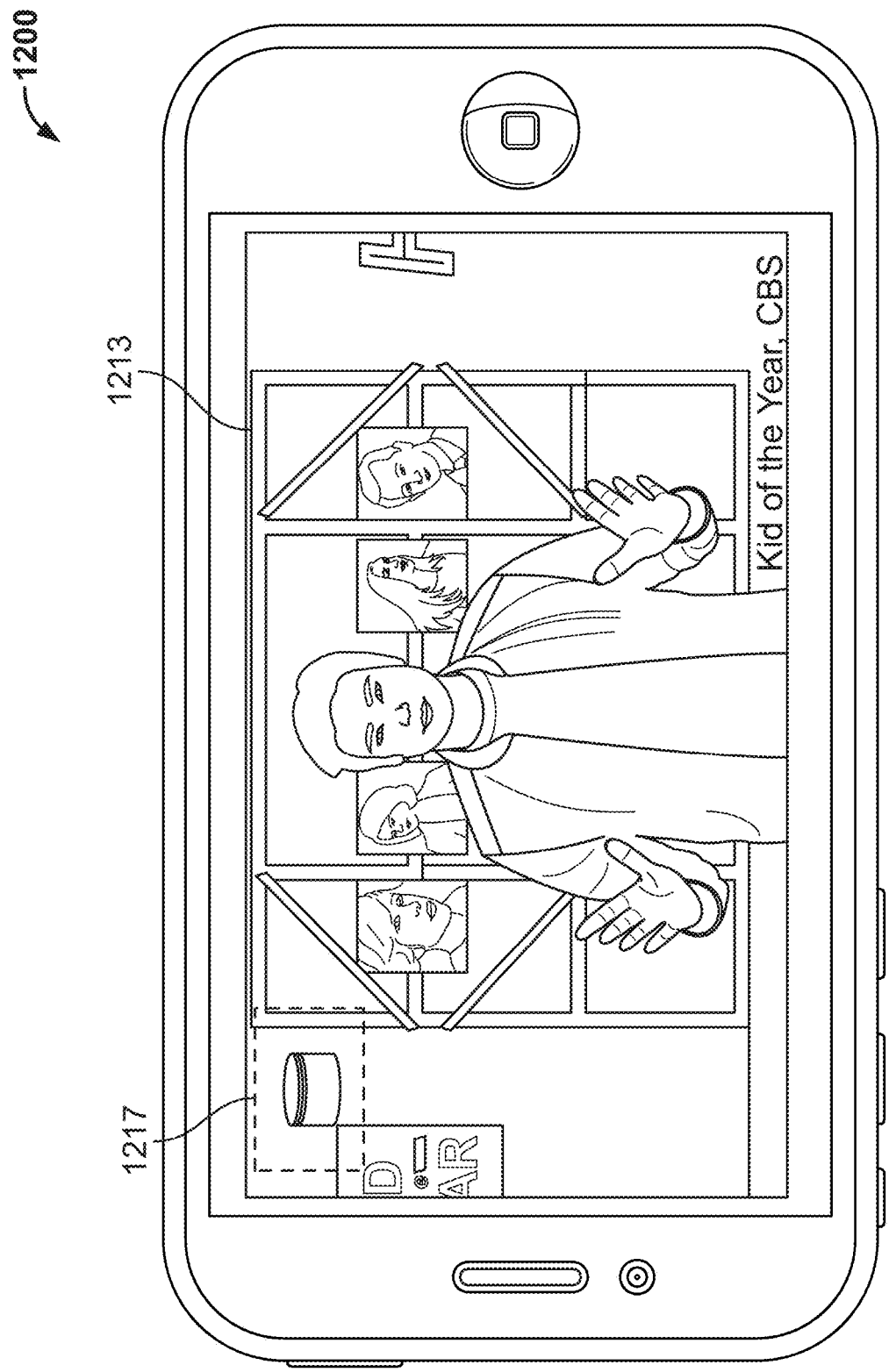
FIG. 12 depicts a trick-mode notification displayed on a smartphone, according to an exemplary embodiment.

Example 4F: Mom is watching Trevor Noah (FIG. 12) while content is being downloaded in the background to facilitate the reward of a bonus screen to a fifth user. A notification icon 1217 or any other suitable indicia may be sent for display on a screen 1213 of a smartphone, e.g., media device 13 (FIG. 1A), 1200 (e.g., FIG. 12), and the like. The notification icon 1217 may be superimposed over currently streaming content as shown in FIG. 12. The notification icon 1217 or the like may be displayed while the downloading of the remaining portion is conducted in the background. The display of the notification icon 1217 is optional and may be omitted entirely.

Example 5A: The system 1 is configured to predict that Grandpa is not streaming (e.g., frequently away from home) from 8:00 a.m. to 6:00 p.m. and often streams content from 7:00 p.m. to 10:00 p.m. The system 1 is configured to monitor consumption patterns of all active users of the service to identify likely, potential conflicts and resolve the same without user intervention. In anticipation of Grandpa's typical usage pattern, and Junior's current streaming session, the system 1 is configured to automatically perform the pre-fetching procedure, i.e., send a portion of or an entirety of one or more media items to a storage device (e.g., 47, 113, 131, 139, 199) to free a stream at a peak usage time period.

Example 5B: The system 1 is configured to perform the pre-fetch during periods of current or predicted low usage, low network load, and the like.

Figure 14:
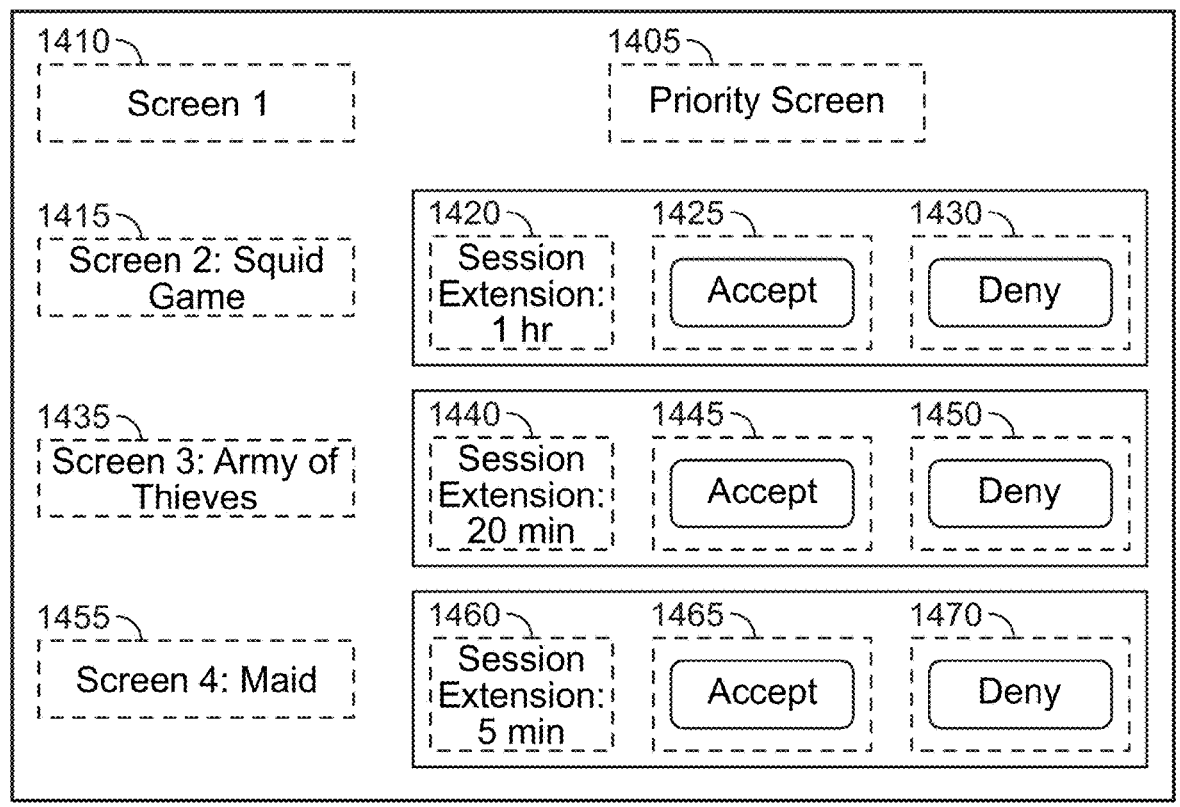
FIG. 14 depicts a GUI screen for display on a media device, according to an exemplary embodiment.

Example 6: Grandpa gets home and is presented with a notification that all four Mercury streams are occupied. The system 1 is configured to display a user interface to Grandpa with a selectable option to request an additional stream, and the system 1 subsequently sends the request to Mom. The system 1 is configured to provide Mom with a selectable option to end a viewing session of any one (or more) of herself, Dad, Junior, and Grandma (e.g., FIG. 14).

Example 7: Mom is presented with a selectable option to send a request to Mercury administrators requesting account review to determine eligibility for a bonus screen (e.g., a fifth screen).

Example 8A: The system 1 is configured to predict (e.g., using the predictive model 650) from usage patterns a highest and/or lowest likelihood of a conflict with the maximum streaming limit occurring (i.e., a peak usage of five simultaneous users) at one or more future dates and/or times.

Example 8B: Mom, Grandma, and Grandpa are residing together in a home in San Jose, Calif.; Junior attends University in New York, N.Y.; and Dad goes to London, England, regularly to conduct business (e.g., the exemplary media device manifest 149 of FIG. 1C). The system 1 is configured to take advantage of the three-hour time difference between San Jose and New York, and the eight-hour time difference between San Jose and London. It is 6:36 p.m. in San Jose, 9:36 p.m. in New York, and 2:36 a.m. in London. The system 1 predicts (e.g., using the predictive model 650) that the highest likelihood of the conflict occurs 9:00 a.m.-12:00 noon in San Jose, 12:00 noon to 3:00 p.m. in New York, and 5:00 p.m.-8:00 p.m. in London; and/or that off-peak usage with a lowest likelihood of conflict with the maximum streaming limit occurs on a weekday around 11:00 p.m. in San Jose, 2:00 a.m. in New York, and 7:00 a.m. in London.

Example 8C: In response to predicting the peak usage, the system 1 is configured to alert one or more of Mom, Dad, Junior, Grandma, and Grandpa that the peak is expected within a certain date and time period.

Example 8D: After alerting Mom of the expected peak, Mom is presented with one or more selectable and/or editable options to manage the streams on the account to reduce the likelihood of the expected peak usage.

Example 8E: After presenting Mom the one or more selectable and/or editable options, the system presents Mom with information and/or a graphic demonstrating the impact selecting or editing the selectable option has on the likelihood of the expected conflict based on a revised prediction (e.g., using the predictive model 650).

Example 8F: In response to predicting the peak usage and/or the off-peak usage, the system 1 pre-fetches content for storage on a connected storage device (e.g., 47, 113, 131, 139, 199) during the off-peak period.

Example 9A: The system 1 pre-fetches and stores enough content to the connected storage device (e.g., 47, 113, 131, 139, 199) to decrease the predicted likelihood (e.g., using the predictive model 650) of the conflict (e.g., five or more devices requesting content when the account is limited to four simultaneous streams) below a pre-determined threshold (e.g., above 50% likelihood, above 90% likelihood, and the like).

Example 9A: Pre-fetching and storing are performed in response to predicting (e.g., using the predictive model 650) a likelihood that the system 1 is currently or will in the future surpass a dynamic threshold.

Example 9B: Pre-fetching and storing are performed in response to predicting (e.g., using the predictive model 650) a likelihood that the system 1 is currently or will in the future surpass a dynamic threshold, the threshold being based on one or more of current and/or predicted streaming sessions, current and/or predicted network availability, current and/or predicted service provider bandwidth speed, current and/or predicted cloud storage service availability, current and/or predicted communication system 1 availability, current and/or predicted consumer bandwidth speed, current and/or predicted storage capacity of the connected storage device (e.g., 47, 113, 131, 139, 199), current and/or predicted consumer device availability, and the like.

Example 10A: Mom is presented with a list of devices for prioritization, e.g., Mom, Dad, Junior, Grandma, and Grandpa's devices. Mom is prompted to identify each media device as a priority device or as a non-priority device.

Example 10B: The system 1 automatically assigns priority or non-priority status to one or more of Mom, Dad, Junior, Grandma, and Grandpa's devices based on analysis of usage patterns.

Example 10C: The system 1 automatically assigns priority status to the user paying for the account (e.g., Mom). E.g., FIG. 14.

Example 10C: The system 1 maintains a stream to a priority device (e.g., Mom's smartphone) regardless of the status of a non-priority device up to a maximum number of concurrent screens that are permitted by the account or subscription (e.g., four).

Example 10D: All five accounts (e.g., Mom, Dad, Junior, Grandma, and Grandpa) are selected by Mom to be priority devices. Four of the accounts are currently streaming. A request by a sixth device, Junior's friend, results in one of the manual, semi-automated, or fully automated options disclosed herein (e.g., the pre-fetching and storing operation).

Example 10E: Any request by a new device to the system 1 is given, by default, a non-priority status.

Example 10F: A total number of priority devices selectable by the account owner (e.g., Mom) is limited to a number one less than the maximum number of streams permitted by the account (e.g., Mom can select up to three devices as priority devices). In this example, the priority devices are super users that will as much as possible have a stream available, and attempts to request access to a number of users greater than four will be automatically denied.

Example 11A: A non-priority window (or any suitable user prompt) is displayed on the non-priority device.

Example 11B: In response to a priority device requesting a stream (e.g., a fifth stream), a non-priority window 1300 (e.g., FIG. 13) is displayed on a non-priority device (e.g., Dad's smartphone), the non-priority window 1300 includes display of one or more of the following: a field 1305 including information explaining a selectable option to a user of the non-priority media device 1305 (e.g., "A Priority Device has requested the screen"; and/or "Screen time is requested by a Prioritized Device"; and/or "If you want to extend screen time, you can request more screen time"; or the like); a selectable option 1310 (e.g., "OK" button), which, upon selection, ends display of streaming content on the non-priority user's media device; and a selectable option 1315 (e.g., "Extend session"), which, upon selection, transmits a request for extension to the media device of the priority user or account owner.

Example 11D: In response to selection of the selectable option 1315 to extend the session, the system 1 determines a time remaining of the media item currently being presented on the non-priority media device, and the request for extension includes the determined time remaining.

Example 11E: In response to selection of the selectable option 1315, the system 1 prompts a user of the non-priority media device to enter or select an amount of time for the request for extension.

Example 12A: A priority window (or any suitable user prompt) is displayed on the priority device.

Example 12B: In response to a request to extend screen time, the system 1 is configured to display the priority window.

Example 12C: In response to a fifth user (e.g., Grandpa) accessing the streaming service or requesting a fifth media content item (e.g., King Arthur: Legend of the Sword) for display on the fifth media device (e.g., Grandpa's network-connected computer), a priority window 1400 (e.g., FIG. 14) is displayed on a priority device (e.g., Mom's smartphone), the priority window 1400 including one or more of the following: a field 1405 identifying the priority window 1400 (e.g., "Priority Screen"); a selectable option 1410, which, when selected, reverts the screen to the currently streaming content (e.g., clicking "Screen 1" reverts Mom's smartphone to Hypnotic); a field 1415 identifying a media device and information about content currently streaming on the device (e.g., "Screen 2: Squid Game" on Dad's tablet); a field 1420 identifying an action to be taken on Screen 2 (e.g., "Session Extension: 1 hr"); a selectable option 1425, which, when selected, accepts the action identified in field 1420 (e.g., a clickable button labeled "Accept," which, when selected, extends Dad's screen time by one hour); a selectable option 1430, which, when selected, denies the action identified in field 1420 (e.g., a clickable button labeled "Deny," which, when clicked, ends Dad's streaming session); a field 1435 identifying another media device and information about content currently streaming on the device (e.g., "Screen 3: Army of Thieves" on Junior's smartphone); a field 1440 identifying an action to be taken on Screen 3 (e.g., "Session Extension: 20 min"); a selectable option 1445, which, when selected, accepts the action identified in field 1440 (e.g., a clickable button labeled "Accept," which, when clicked, extends Junior's screen time by 20 minutes); a selectable option 1450, which when selected, denies the action identified in field 1440 (e.g., a clickable button labeled "Deny," which would end Junior's streaming session); a field 1455 identifying yet another media device and information about content currently streaming on the device (e.g., "Screen 4: Maid" on Grandma's streaming media box system); a field 1460 identifying an action to be taken on Screen 4 (e.g., "Session Extension: 5 min"); a selectable option 1465, which when selected, accepts the action identified in field 1460 (e.g., a clickable button labeled "Accept," which, when clicked, extends Grandma's screen time by 20 minutes); and a selectable option 1470, which, when selected, denies the action identified in field 1450 (e.g., a clickable button labeled "Deny," which would end Grandma's streaming session).

The terminology used herein is for the purpose of describing exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes all combinations of one or more of the associated listed items.

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

The use of the terms "first", "second", "third", and so on, herein, are provided to identify structures or operations, without describing an order of structures or operations, and, to the extent the structures or operations are used in an exemplary embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), etc.

The interfaces, processes, and analysis described may, in some exemplary embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed. More generally, the disclosure herein is meant to be exemplary and not limiting. Only the claims that follow are meant to set bounds as to what the present disclosure includes. Furthermore, it should be noted that the features and limitations described in any one exemplary embodiment may be applied to any other exemplary embodiment herein, and flowcharts or examples relating to one exemplary embodiment may be combined with any other exemplary embodiment in a suitable manner, done in different orders, or done in parallel. In addition, the systems and methods described herein may be performed in real time. It should also be noted that the systems and/or methods described herein may be applied to, or used in accordance with, other systems and/or methods.

Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method for controlling delivery of media content from a streaming service to a requesting media device through a communication system, the method comprising:
   receiving a request to stream a media content item;
   in response to receiving the request:
      accessing a profile of a user authorized to access the streaming service;
      identifying a maximum number of streams authorized by the streaming service to stream a maximum number of media content items to a maximum number of media devices;
      determining a number of currently streaming media devices associated with the profile of the user;
      determining whether addition of the requested stream would, if authorized, cause the number of currently streaming media devices to exceed the maximum number of media devices; and
   in response to the determining that the addition of the requested stream would, if authorized, cause the number of currently streaming media devices to exceed the maximum number of media devices:
      determining that a storage device of a selected currently streaming media device has sufficient storage to store a remaining portion of a selected media content item playing on the selected currently streaming media device;
      transmitting the remaining portion of the selected media content item playing on the selected currently streaming media device to the storage device;
      disconnecting the selected currently streaming media device from the streaming service to free up a stream and cause the number of currently streaming media devices to be less than or equal to the maximum number of media devices; and
      authorizing the requested stream.

2. The method of claim 1, further comprising:
   determining, for each of the currently streaming media devices, a length of time remaining for the respective media content item playing on that currently streaming media device; and
   determining the selected currently streaming media device of the currently streaming media devices having a shortest length of time remaining for the media content item playing on the selected currently streaming media device.

3. The method of claim 1, further comprising:
   analyzing consumption patterns of the requesting media device and associated with the profile to determine that an exception condition is satisfied; and
   in response to determining that the exception condition is satisfied, authorizing the requested stream.

4. The method of claim 3, wherein the exception condition is satisfied in response to determining that one or more of these are true:
   a number of consecutive on-time payments for a subscription to the streaming service meets or exceeds a maximum number; or
   the subscription is in good standing, or
   the subscription is a premium plan, or
   no violation of terms of service of the subscription has occurred.

5. The method of claim 1, wherein the method does not require one or more of prior authorization of the requesting media device, setting a home network, performing a mobile check-in, inputting of an access code, and completion of challenge-response tests.

6. The method of claim 1, further comprising:
   predicting, with a predictive model, an impact of the addition of the requested stream on the status of the at least one of the streaming service, the requesting media device, the media content item, the communication system, the profile, and the selected currently streaming media device; and
   determining whether the impact satisfies a predetermined standard.

7. The method of claim 6, further comprising:
   disabling a load-increasing function of the stream to reduce a load on one or more of the streaming service, the requesting media device, the communication system, and the selected currently streaming media device; and
   determining that the load after the disabling satisfies a predetermined standard.

8. The method of claim 7, wherein the load-increasing function is a trick-mode.

9. The method of claim 6, wherein the predictive model is based on one or more of: a hard rule; a user-defined rule; a rule defined by the streaming service; a hard model; a learning model; a usage pattern of one or more of the streaming service, the requesting media device, the media content item, the communication system, the profile, and the selected currently streaming media device; load data of one or more of the streaming service, the requesting media device, the media content item, the communication system, the profile, and the selected currently streaming media device; and metadata of one or more of the streaming service, the requesting media device, the media content item, the communication system, the profile, and the selected currently streaming media device.

10. The method of claim 1, further comprising:
    determining that the requesting media device has either a priority status or a non-priority status; and
    determining that the selected currently streaming media device has either a priority status or a non-priority status.

11. The method of claim 10, further comprising:
in response to determining that the requesting media device has the priority status:
determining the priority status of the selected currently streaming media device;
in response to determining that the selected currently streaming media device has the non-priority status, generating for display a user control interface on the requesting media device having the priority status; and
in response to determining that the selected currently streaming media device also has the priority status, generating for display a user control interface on the selected currently streaming media device; and
in response to determining that the requesting media device has the non-priority status, generating for display a user control interface on the selected currently streaming media device.

12. The method of claim 11, wherein the user control interface includes one or more selectable options to control a function of the stream of any currently streaming media device, the functions including: ending the stream, setting a length of time of the stream, extending a length of time of the stream, setting a start time of the stream, setting an end time of the stream, accepting a request to extend a length of time of the stream, and denying a request to extend a length of time of the stream.

13. The method of claim 10, wherein the priority status is determined based on one or more of: a query of a priority list of media devices stored in the profile, an average length of time for a continuous session of the media content item playing on each media device, a location of the media device, and a local time of the media device.

14. The method of claim 1, further comprising:
generating for display a user control interface, wherein the user control interface includes a selectable option to end a streaming session of any currently streaming media device to free up a stream and cause the number of currently streaming media devices to be less than or equal to the maximum number of media devices.

15. The method of claim 1, wherein the authorized requested stream is authorized for a predetermined time limit.

16. A system for controlling delivery of media content from a streaming service to a requesting media device through a communication system, the system comprising control circuitry configured to perform:
receiving a request to stream a media content item;
in response to receiving the request:
accessing a profile of a user authorized to access the streaming service;
identifying a maximum number of streams authorized by the streaming service to stream a maximum number of media content items to a maximum number of media devices;
determining a number of currently streaming media devices associated with the profile of the user;
determining whether addition of the requested stream would, if authorized, cause the number of currently streaming media devices to exceed the maximum number of media devices; and
in response to the determining that the addition of the requested stream would, if authorized, cause the number of currently streaming media devices to exceed the maximum number of media devices:
determining that a storage device of a selected currently streaming media device has sufficient storage to store a remaining portion of a selected media content item playing on the selected currently streaming media device;
transmitting the remaining portion of the selected media content item playing on the selected currently streaming media device to the storage device;
disconnecting the selected currently streaming media device from the streaming service to free up a stream and cause the number of currently streaming media devices to be less than or equal to the maximum number; and
authorizing the requested stream.

17. A non-transitory computer-readable medium having non-transitory computer-readable instructions encoded thereon for controlling delivery of media content from a streaming service to a requesting media device through a communication system,
wherein the instructions, when executed by control circuitry, cause the control circuitry to perform functions of:
receiving a request to stream a media content item;
in response to receiving the request:
accessing a profile of a user authorized to access the streaming service;
identifying a maximum number of streams authorized by the streaming service to stream a maximum number of media content items to a maximum number of media devices;
determining a number of currently streaming media devices associated with the profile of the user;
determining whether addition of the requested stream would, if authorized, cause the number of currently streaming media devices to exceed the maximum number of media devices; and
in response to the determining that the addition of the requested stream would, if authorized, cause the number of currently streaming media devices to exceed the maximum number of media devices:
determining that a storage device of a selected currently streaming media device has sufficient storage to store a remaining portion of a selected media content item playing on the selected currently streaming media device;
transmitting the remaining portion of the selected media content item playing on the selected currently streaming media device to the storage device;
disconnecting the selected currently streaming media device from the streaming service to free up a stream and cause the number of currently streaming media devices to be less than or equal to the maximum number of media devices; and
authorizing the requested stream.

18. The method of claim 1, further comprising, after authorizing the requested stream, generating for display a reward message.

19. The method of claim 18, wherein the reward message includes one or more of:
information identifying conditions that satisfy the authorization of the requested stream;
information identifying a maximum number of streams associated with an account of the streaming service;

information identifying the maximum number of streams associated with the account of the streaming service plus one;
information identifying a duration for the authorization of the requested stream;
a selectable option to share news information regarding the authorization of the requested stream to one or more of social media, other media devices linked to the account, and email;
information identifying an owner of the account;
information identifying a stream subject to local download;
information identifying disablement of a load-increasing function; and
information identifying a load-increasing function.

* * * * *